US012252386B2

(12) United States Patent
Boissières et al.

(10) Patent No.: US 12,252,386 B2
(45) Date of Patent: Mar. 18, 2025

(54) TUBE HOLDING APPARATUSES FOR FILLING OF MULTIPLE CONTAINERS AND METHODS FOR USING THE SAME

(71) Applicant: Sartorius Stedim North America Inc., Bohemia, NY (US)

(72) Inventors: Karine Vizcaino Boissières, La Ciotat (FR); Ali Hojeij, Marseilles (FR); Amélie Rethore, Roquevaire (FR); Timothy Cardace, Bellmore, NY (US); Aleksander Shamin, Hewlett, NY (US); Meghan Keenan, Bayport, NY (US)

(73) Assignee: Sartorius Stedim North America Inc., Bohemia, NY (US)

( * ) Notice: Subject to any disclaimer, the term of this patent is extended or adjusted under 35 U.S.C. 154(b) by 0 days.

(21) Appl. No.: 18/617,230

(22) Filed: Mar. 26, 2024

(65) Prior Publication Data

US 2024/0351848 A1 Oct. 24, 2024

Related U.S. Application Data

(63) Continuation of application No. 18/545,316, filed on Dec. 19, 2023.

(Continued)

(51) Int. Cl.
*B67C 3/26* (2006.01)
*B65B 37/02* (2006.01)

(52) U.S. Cl.
CPC ................ *B67C 3/26* (2013.01); *B65B 37/02* (2013.01); *B67C 2003/2602* (2013.01)

(58) Field of Classification Search
CPC ... B67C 3/26; B67C 2003/2602; B65B 37/02; A61M 39/10

(Continued)

(56) References Cited

U.S. PATENT DOCUMENTS 5,302,073 A 4/1994 Riemersma et al.
5,316,246 A 5/1994 Scott et al.

(Continued)

FOREIGN PATENT DOCUMENTS

AT 153937 B 7/1938
AU 670474 B2 7/1996

(Continued)

OTHER PUBLICATIONS

PreciGenome (website, https://www.precigenome.com/microfluidic-fluidic/bubble-trap ) (YouTube demonstration video of a commercially available product, https://www.youtube.com/watch?v=zVxN1EO5DHY&list=TLGG2S1qiRnzZp0wMjA4MjAyNA). (Year: 2021).*

(Continued)

*Primary Examiner* — Timothy L Maust
*Assistant Examiner* — Christopher M Afful
(74) *Attorney, Agent, or Firm* — Womble Bond Dickinson (US) LLP

(57) ABSTRACT

A tube holding apparatus includes a body, a mount, a first guide, and a second guide. The body has a proximal end portion and a distal end portion. The mount is positioned between the proximal end portion and the distal end portion of the body. The mount is configured to secure the body to a valve tower. The first guide is secured about the proximal end portion of the body. The second guide is secured about the distal end portion of the body. The first guide and the second guide each configured to receive a portion of a transfer link that extends between a valve tower and a storage container such that a positive slope container to the valve tower.

30 Claims, 12 Drawing Sheets

Related U.S. Application Data

(60) Provisional application No. 63/461,035, filed on Apr. 21, 2023.

(58) Field of Classification Search
USPC .......................................................... 137/84
See application file for complete search history.

(56) References Cited

U.S. PATENT DOCUMENTS

| | | | |
|---|---|---|---|
| 5,323,992 | A | 6/1994 | Sifers et al. |
| 5,617,641 | A | 4/1997 | Aarhus |
| 5,701,937 | A | 12/1997 | Bourboulou et al. |
| 6,442,896 | B1 | 9/2002 | Chapin, III |
| 6,725,888 | B1 | 4/2004 | Richter et al. |
| 7,207,530 | B2 | 4/2007 | Ismert et al. |
| 7,892,197 | B2 | 2/2011 | Folden et al. |
| 7,931,242 | B2 | 4/2011 | Tjerrild |
| 8,281,672 | B2 | 10/2012 | Lee et al. |
| 9,315,281 | B2 | 4/2016 | Dissanayake |
| 9,365,304 | B2 | 6/2016 | Mueller |
| 10,835,666 | B2 | 11/2020 | Amir et al. |
| 10,858,205 | B2 | 12/2020 | Oriols Gaja et al. |
| 11,462,897 | B2 | 10/2022 | Marchek et al. |
| 11,466,796 | B2 | 10/2022 | Fisher |
| 11,592,123 | B2 | 2/2023 | Hennon |
| 11,787,680 | B2 | 10/2023 | Hartridge et al. |
| 11,814,200 | B2 | 11/2023 | Seal et al. |
| 2003/0230521 | A1 | 12/2003 | Schick |
| 2004/0109385 | A1 | 6/2004 | Wisniewski |
| 2004/0195178 | A1 | 10/2004 | Carpenter et al. |
| 2010/0236340 | A1 | 9/2010 | Lee et al. |
| 2012/0222774 | A1* | 9/2012 | Husnu ..................... B65B 37/06 141/69 |
| 2012/0291627 | A1* | 11/2012 | Tom ..................... B67D 7/0261 95/8 |
| 2013/0240082 | A1 | 9/2013 | Mueller |
| 2013/0269806 | A1* | 10/2013 | Burns ............... B01F 33/50114 137/594 |
| 2014/0027010 | A1 | 1/2014 | Janssens et al. |
| 2014/0137978 | A1 | 5/2014 | Dissanayake |
| 2014/0346291 | A1 | 11/2014 | Booth |
| 2016/0200038 | A1* | 7/2016 | Gagne ..................... F16L 33/34 285/133.11 |
| 2019/0106312 | A1 | 4/2019 | Semmler et al. |
| 2020/0108484 | A1* | 4/2020 | Kavka-Coogan ..... B24C 7/0023 |
| 2023/0051286 | A1* | 2/2023 | Baldwin ................... F15D 1/04 |
| 2023/0077918 | A1 | 3/2023 | Bode et al. |

FOREIGN PATENT DOCUMENTS

| | | | |
|---|---|---|---|
| AU | 759428 | B2 | 4/2003 |
| AU | 2003238233 | A1 | 12/2003 |
| AU | 2003254305 | A1 | 2/2004 |
| BR | 102012019982 | A2 | 9/2014 |
| CA | 2148831 | A1 | 5/1994 |
| CA | 2489603 | A1 | 12/2003 |
| CA | 2549693 | A1 | 7/2005 |
| CA | 2700888 | A1 | 3/2009 |
| CN | 101868261 | A | 10/2010 |
| CN | 204057270 | U | 12/2014 |
| CN | 208327382 | U | 1/2019 |
| CN | 208452867 | U | 2/2019 |
| CN | 208453660 | U | 2/2019 |
| CN | 211304123 | U | 8/2020 |
| CN | 113531372 | A | 10/2021 |
| DE | 1193418 | B | 5/1965 |
| DE | 2303063 | A1 | 7/1974 |
| DE | 69311321 | T2 | 1/1998 |
| DE | 202011104232 | U1 | 9/2011 |
| DE | 102010060469 | B3 | 11/2011 |
| DE | 102011004286 | A1 | 8/2012 |
| DE | 202013003892 | U1 | 6/2013 |
| DE | 102011001584 | B4 | 11/2018 |
| DE | 102017123296 | A1 | 4/2019 |
| EP | 667762 | A1 | 8/1995 |
| EP | 1050497 | A1 | 11/2000 |
| EP | 2409130 | A2 | 1/2012 |
| EP | 2637932 | A1 | 9/2013 |
| EP | 2691305 | A1 | 2/2014 |
| EP | 2691306 | A1 | 2/2014 |
| EP | 2928777 | A1 | 10/2015 |
| EP | 3466818 | A1 | 4/2019 |
| EP | 3478599 | A1 | 5/2019 |
| FR | 2664354 | A1 | 1/1992 |
| FR | 2715690 | A1 | 8/1995 |
| GB | 895914 | A | 5/1962 |
| GB | 2510648 | A | 8/2014 |
| HK | 1216522 | A1 | 11/2016 |
| JP | S5787727 | A | 6/1982 |
| JP | 2004195982 | A | 7/2004 |
| JP | 05583488 | B2 | 9/2014 |
| JP | 06541984 | B2 | 7/2019 |
| KR | 1611249 | B1 | 4/2016 |
| KR | 20190003136 | A | 1/2019 |
| RU | 182625 | U1 | 8/2018 |
| WO | 1993019985 | A1 | 10/1993 |
| WO | 2003093146 | A1 | 11/2003 |
| WO | 2004012798 | A1 | 2/2004 |
| WO | 2010108091 | A2 | 9/2010 |
| WO | 2012062383 | A1 | 5/2012 |
| WO | 2018039093 | A1 | 3/2018 |
| WO | 2022132544 | A1 | 6/2022 |

OTHER PUBLICATIONS

ChemEurope.com definition of "degasification". Found at https://www.chemeurope.com/en/encyclopedia/Degasification.html) (Year: 2020).*

International Search Report and Written Opinion for PCT Application No. PCT/IB2024/053800 issued Jul. 18, 2024, 10 pages.

RoSS.FILL Fill & Filtration System by Single Use Support, retrieved from https://www.susupport.com/solutions/platform-systems/fill accessed by The Wayback Machine Internet Archives, known at least as early as Jul. 1, 2022, 1 page.

Linak LC3 Lifting Column, retrieved from https://www.linak-us.com/products/lifting-columns/lc3/ accessed by The Wayback Machine Internet Archives, known at least as early as Jul. 1, 2022, 19 pages.

International Search Report and Written Opinion for PCT Application No. PCT/IB2023/056785, issued Oct. 30, 2023, 17 pages.

Cytiva Tubing Holder Comb, retrieved from https://www.cytivalifesciences.com/en/us/shop/chromatography/tools-and-accessories/column-accessories/tubing-holder-comb-p-04835, known at least as early as Apr. 21, 2023, 4 pages.

Reef Builders Tunze Multi Tube Holder Secures Dosing Lines for only $12.99, retrieved from https://reefbuilders.com/2022/05/05/tunze-multi-tube-holder/, known at least as early as Apr. 21, 2023, 5 pages.

AliExpress TM-06 Multi-tube Holder, Polypropylene, 10 Holders, 6 mm Tube OD 100PCS/box, retrieved from https://www.aliexpress.com/i/2251800294271924.html?gatewayAdapt=4itemAdapt, known at least as early as Apr. 21, 2023, 5 pages.

Bulk Reef Supply ¼" RO Tubing Brackets, retrieved from https://www.bulkreefsupply.com/1-4-ro-tubing-brackets-niche3d.html, known at least as early as Apr. 21, 2023, 5 pages.

Midwest Control ½ Hose OD, Multitube Holder, retrieved from https://www.mscdirect.com/product/details/65253650, known at least as early as Apr. 21, 2023, 3 pages.

GrabCAD Phobya Multiple Tubing Holder, retrieved from https://grabcad.com/library/phobya-multiple-tubing-holder, known at least as early as Apr. 21, 2023, 4 pages.

Xhnotion Pu Hose Rack, retrieved from https://www.xhnotion.com/PU-Hose-Rack-pd40432885.html, known at least as early as Apr. 21, 2023, 4 pages.

SnakeClamp Double Clamp SnakeClamp Flexible Gooseneck Third Hand, retrieved from https://snakeclamp.com/collections/double-clamp, known at least as early as Apr. 21, 2023, 3 pages.

B&H Foto & Electronics Corp. GyroVu Heavy-Duty Articulated Arm with Dual Jaw Clamps, retrieved from https://www.bhphotovideo.

(56) References Cited

OTHER PUBLICATIONS com/c/product/1333245-REG/gyrovu_gv_cm7hcm_dual_clamp_mount_with.html, known at least as early as Apr. 21, 2023, 3 pages.
Amazon 3nh 10Pc Stainless Steel Clip Clothes Stand Hanger Skirt Kid Clothes Adjustable Pinch Grip, retrieved from https://www.amazon.in/Generic-Stainless-Clothes-Hanger-Adjustable/dp/B07L2ZV1DP, known at least as early as Apr. 21, 2023, 2 pages.

* cited by examiner

TUBE HOLDING APPARATUSES FOR FILLING OF MULTIPLE CONTAINERS AND METHODS FOR USING THE SAME

CROSS-REFERENCE TO RELATED APPLICATION

This application is a continuation application of U.S. patent application Ser. No. 18/546,316, filed Dec. 19, 2023, which claims benefit of, and priority to, U.S. Provisional Patent Application Ser. No. 63/461,035, filed Apr. 21, 2023. The entire contents of each of the above applications are hereby incorporated by reference.

BACKGROUND

1. Technical Field

The present disclosure relates to fluid handling and, more specifically, to apparatuses for holding tubes for filling of multiple containers and for transfer tube sets for filling multiple containers.

2. Discussion of Related Art

During manufacture, storage, and distribution of biopharmaceutical compositions, containers are filled and drained of biopharmaceutical compositions in a liquid state. For example, a biopharmaceutical composition is pumped from a production vessel into one or more storage containers. Once filled, the storage containers may be frozen, stored, and/or shipped to another facility. Before use, the biopharmaceutical composition within the storage containers is thawed and/or drained from the storage containers.

In some applications, containers, e.g., Celsius® FFT containers from Sartorius, are loaded into a Fill and Drain Station (FDS) that is used to fill and drain the containers. In the FDS the containers are held in a horizontal orientation. In the horizontal orientation, it may be difficult to completely fill and/or drain all of a biopharmaceutical composition from the containers. In addition, in the horizontal orientation, it may be difficult to purge air from the tubing leading to the container and/or the container itself prior to filling of the container. Once filled, the storage containers may be frozen, e.g., cryogenically frozen.

There are at least four technical difficulties with filling, storing, and ultimately using a biopharmaceutical composition with the storage containers. First, the speed or time required to prime the containers for filling. The time required to prime a container may decrease the efficiency of distributing fluid into a container. In addition, the quality and the consistency of the priming may affect the fill volume or the accuracy of the fill of a storage container which is the second technical difficultly. Ensuring an accurate fill volume of a storage container may be important to ensure that each container includes the desired amount of fluid therein. The third difficulty may be the freezing of the fluid within the storage container. The freezing pattern may be important to ensure that all the fluid within the storage container is frozen within a desired amount of time. The fourth technical difficulty is the amount of waste of a fluid during filling and ultimately distribution.

SUMMARY

This disclosure is directed to addressing each of the four technical difficulties detailed above. As detailed herein, the shape and/or angle of the connectors of the valve towers are designed to improve priming of the system. In addition, the slope of the fill tubes are maintained to improve priming of the system. Improving priming may increase the fill volume and/or allow for an increase in accuracy of the fill volume for each container. Improving the priming may remove or prevent air from the storage containers during priming and filling. Removing or preventing air from the storage containers may improve a freeing pattern within the storage containers. The priming detailed herein may reduce an amount of fluid required to prime the storage containers. The system may include bubble traps that allow for the use of priming fluid to be recovered after a priming and filling recipe. Allowing a priming fluid to be recovered may reduce waste fluid from a priming and filling recipe.

During filling and/or draining it has been found that maintaining a constant slope in each of the tubes relative to the FDS may assist in purging air from the tubes and/or the storage containers being filled. It may be difficult to keep a constant slope in the tubes base on tolerances of the tubes and/or the connectors of the tubes. In addition, the FDS may allow for the use of multiple size containers such that the distance between the valve towers and the storage containers may vary. While it is possible to move the valve towers, the towers are heavy and may be difficult to precisely position each time the storage containers are changed.

This disclosure relates to apparatuses for maintaining a constant slope relative to the FDS in each of the tubes that connect to the storage containers. Maintaining a constant slope may purge air from the tubes and/or the storage containers during filling of the storage containers. Purging air from the tubes and/or the storage containers may allow for a more complete filling for the storage containers. Maintaining a constant slope in the tubes may allow for a consistent or more precise filling of the storage containers. The apparatuses disclosed herein may allow for adjustment of the tubes to differences in the size of the storage containers of the FDS without moving the valve towers. Allowing for adjustment of the tubes may reduce time required to change storage containers.

In an embodiment of the present disclosure, a filling system for filling storage containers with a fluid includes a first storage container, a second storage container, a valve tower, and a transfer tube set. The valve tower has a manifold configured to receive a fluid. The transfer tube set includes an inlet, an outlet, a first connection tube, a second connection tube, and a riser. The inlet is at an upstream end of the transfer tube set. The inlet is fluidly coupled to the manifold. The outlet is at a downstream end of the transfer tube set. The outlet is open to an environment surrounding the filling system. The first connection tube is fluidly coupled to the first storage container to aseptically provide fluid from the manifold to the first storage container. The second connection tube is fluidly coupled to the second storage container to aseptically provide fluid from the manifold to the second storage container. The riser extends between and fluidly couples the inlet to the outlet. The riser includes a first connector and a second connector. The first connector fluidly couples the first connection tube to the riser. The second connector fluidly couples the second connection tube to the riser. The first connector includes a first interlink portion, a second interlink portion, and a connection portion. The connection portion extends from the first interlink portion and the second interlink portion to form a Y-shape with the first interlink portion and the second interlink portion defining a Y-angle therebetween less than 130 degrees. The connection portion of the first connector is fluidly coupled to the first connection tube and is configured to fill the storage container with the fluid received by the manifold.

In embodiments, the Y-angle between the first interlink portion and the second interlink portion is in the range of 30 degrees to 90 degrees. The filling system may further include a tube holding apparatus configured to maintain a negative slope in the first connection tube from the first connector to the first storage container.

In some embodiments, the filling system may further include a fill and drain station that support the first storage container and the second storage container. The fill and drain station may include a scale configured to determine the volume of fluid in the first storage container and the second storage container based on a mass of the fill and drain station.

In certain embodiments, the connection portion of the first connector is angled downward at an inclination angle from horizontal. The inclination angle may be in the range of 15 degrees to 35 degrees.

In particular embodiments, the first interlink portion defines a first interlink central longitudinal axis and the connector portion defines a connector central longitudinal axis. The first interlink central longitudinal axis and the connector central longitudinal axis are offset from one another by a connector angle. The connector angle may be greater than or equal to 115 degrees. The connector angle may be in a range of 135 degrees to 165 degrees.

In embodiments, the riser includes a first interlink tube that extends between and fluidly couples the first connector and the second connector. The first interlink tube may have a length in a range of 130 percent and 180 percent of the vertical distance between the first connector and the second connector.

In some embodiments, the transfer tube set includes a bubble trap downstream of the second connector and upstream of the outlet. The bubble trap is configured to aseptically receive and store fluid from priming such that the captured fluid may be recaptured without further processing. The bubble trap may include a trap segment, a bulb, and a vent segment. The trap segment may be positioned between the second connector and the bulb. The trap segment may be in direct communication with and positioned below the bulb. The vent segment may extend vertically from the bulb and extend to the outlet. The bulb may be sized such that the bulb is configured to only be partially filled during a priming process.

In another embodiment of the present disclosure, a filling system for filling storage containers with a fluid includes a first storage container, a second storage container, a valve tower, and a transfer tube set. The valve tower has a manifold. The manifold is configured to receive a fluid. The transfer tube set includes an inlet, an outlet, a first connection tube, a second connection tube, and a riser. The inlet is at an upstream end of the transfer tube set. The inlet is fluidly coupled to the manifold. The outlet is at a downstream end of the transfer tube set. The outlet is open to an environment surrounding the filling system. The first connection tube is fluidly coupled to the first storage container to aseptically provide fluid from the manifold to the first storage container. The second connection tube is fluidly coupled to the second storage container to aseptically provide fluid form the manifold to the second storage container. The riser extends between and fluidly couples the inlet to the outlet. The riser includes a first interlink tube, a second interlink tube, a first connector, and a second connector that are in fluid communication with one another. The first interlink tube extends from the inlet to the first connector. The second interlink tube extends between the first connector and the second connector. The first connector includes a first interlink portion, a second interlink portion, and a connection portion. The first interlink portion is fluidly coupled to the first interlink tube. The second interlink portion is fluidly coupled to the second interlink tube. The connection portion extends from the first interlink portion and the second interlink portion. The connection portion or the first connector fluidly couples to the first connection tube and is configured to fill the first storage container with the fluid received by the manifold. The connection portion is angled downward at an angle from horizontal.

In embodiments, the inclination angle is in a range of 15 degrees to 35 degrees. The inclination angle may be in a range of 15 to 30 degrees.

In some embodiments, the connection portion may extend from the first interlink portion and the second interlink portion to form a Y-shape with a first interlink portion and the second interlink portion. The first interlink portion and the second interlink portion may define an angle therebetween less than 130 degrees. The angle between the first interlink portion and the second interlink portion may be in a range of 30 degrees to 90 degrees. The first interlink portion may define a first interlink central longitudinal axis and the connector portion may define a connector central longitudinal axis. The first interlink central longitudinal axis and the connector central longitudinal axis may be offset from one another by a connector angle. The connector angle may be greater than or equal to 115 degrees.

In certain embodiments, the transfer tube set includes a bubble trap downstream of the second connector and upstream of the outlet. The bubble trap may be configured to aseptically receive and store fluid from priming such that the captured fluid may be recaptured without further processing. The bubble trap may include a trap segment, a bulb, and a vent segment. The trap segment may be positioned between the second connector and the bulb. The trap segment may be in direct communication with and positioned below the bulb. The vent segment may extend vertically from the bulb and may extend to the outlet. The bulb may be sized such that the bulb may be configured to only be partially filled during a priming process.

In accordance with anther embodiment of the present disclosure, a transfer tube set includes an inlet, an outlet, a first connection tube, a second connection tube, and a riser. The inlet is at an upstream end of the transfer tube set. The inlet is configured to fluidly couple to a manifold to receive fluid. The outlet is at a downstream end of the transfer tube set. The outlet is open to an environment surrounding the transfer tube set. The first connection tube is configured to fluidly couple to a first storage container to aseptically provide fluid from the manifold to the first storage container. The second connection tube is configured to fluidly couple to a second storage container to aseptically provide fluid from the manifold to the second storage container. The riser extend between and fluidly couples the inlet to the outlet. The riser includes a first connector that fluidly couples the first connection tube to the riser. The riser includes a second connector that fluidly couples the second connection tube to the riser. The first connector includes a first interlink portion, a second interlink portion, and a connection portion. The first interlink portion defines a first interlink central longitudinal axis. The second interlink portion defines a second interlink central longitudinal axis. The second interlink longitudinal axis is offset at a Y-angle from the first interlink central longitudinal axis. The Y-angle is less than 135 degrees. The connection portion extends from the first interlink portion and the second interlink portion to form a Y-shape with the first interlink portion and the second interlink portion. The connection portion of the first connector is fluidly coupled to the first connection tube.

In embodiments, the Y-angle is in the range of 30 degrees to 90 degrees. The connection portion may define a connection central longitudinal axis. The connection central longitudinal axis may be offset from the first interlink central longitudinal axis by a connection angel. The connection angle may be greater than or equal to 115 degrees.

In some embodiments, the transfer tube set further comprises a bubble trap downstream of the second connector and upstream of the outlet. The bubble trap may be configured to aseptically receive and store fluid from priming such that the captured fluid may be recaptured without further processing. The bubble trap may include a trap segment, a bulb, and vent segment. The trap segment may be positioned between the second connector and the bulb. The trap segment may be in direct communication with and positioned below the bulb. The vent segment may extend vertically from the bulb and may extend to the outlet. The bulb may be sized such that the bulb may be configured to only be partially filled during a priming process.

In certain embodiments, the riser includes a first interlink tube that fluidly couples to the second interlink portion of the first connector and to the first interlink portion of the second connector to fluidly couple the first connector and the second connector. The first interlink tube may be configured to have a C-shape when the first connector and the second connector are installed on a valve tower. The riser may include a first interlink tube that fluidly couples to the second interlink portion of the first connector and to the first interlink portion of the second connector to fluidly couple the first connector and the second connector. The first connector and the second connector may be configured to be installed on a valve tower such that a vertical distance is defined therebetween. The first interlink tube may have a length in the range of 130 percent and 180 percent of the vertical distance between the first connector and the second connector when the first connector and the second connector are installed on the valve tower.

In another embodiment of the present disclosure, a method of priming a filling system includes installing a transfer tube set on a valve tower of the filling system, flowing fluid into the transfer tube set, and allowing air to exit the connection tubes of the transfer tube set. Installing the transfer tube set on a valve tower of the filling system includes securing the transfer tube set on the valve tower with each connector of the transfer tube set positioned to correspond to a respective storage container with each connector having a connection tube that extends from the respective connector to the associated storage container, setting an inclination angle of each connection connector such that a connection portion of the connector is offset downward from horizontal, and setting a slope of each connection tube to be negative from the respective connector to the associated storage container. Allowing air to exit the connection tubes of the transfer tube set includes allowing air to exit such that air in the connection tubes is removed upstream of a last connector.

In embodiments, flowing fluid into the transfer tube set includes flowing fluid at a first flow rate and flowing fluid at a second flow rate that is less than the first flow rate until air is removed upstream of the last connector. The method may further include recapturing fluid from a bubble trap downstream of the last connector for future use after priming.

In another embodiment of the present disclosure, a tube holding apparatus includes a body, a mount, a first guide, and a secured guide. The body has a proximal end portion and a distal end portion. The mount is positioned between the proximal end portion and the distal end portion of the body. The mount is configured to secure the body to a valve tower. The first guide is secured about the proximal end portion of the body. The second guide is secured about the distal end portion of the body. The first guide and the second guide each configured to receive a portion of a transfer link that extends between a valve tower and a storage container such that a positive slope container to the valve tower.

In embodiments, the first guide is slidingly secured about the proximal end portion of the body between a proximal end of the body and the mount. The mount slidingly receives the body therethrough. The second guide may be fixed to the distal end portion of the body. The body may be slidably distally relative to the mount to reduce slop in the transfer link.

In some embodiments, the second guide may be fixed to the distal end portion of the body and may be configured to position a distal end of the transfer link relative to the valve tower.

In another embodiment of the present disclosure, a valve tower for providing fluid to a plurality of storage containers and includes a transfer tube set and a plurality of tube holding apparatus. The tube transfer set includes a plurality of transfer lines. Each transfer link is configured to fluidly connect to a respective storage container of the plurality of storage containers. Each tube holding apparatus is configured to maintain a positive slope in a respective transfer link of the plurality of transfer links.

In another embodiment of the present disclosure, a filling system for fluid storage containers includes a valve tower, a filling and draining station (FDS), a first storage container supported on the FDS, a first transfer link, and a tube holding apparatus. The first transfer link fluidly connects the valve tower and the first storage container. The tube holding apparatus maintains a positive slope in the first transfer link from the storage container to the valve tower.

In embodiments, the filling station includes a plurality of storage containers that are supported on the FDS which include the first storage container. The first storage container includes a container tube that extends from the first storage container. The container tube is in fluid communication with an interior of the first storage container.

In some embodiments, the filling station includes a transfer tube set that includes a plurality of connection tubes. Each connection tube of the plurality of connection tubes are in fluid communication with the valve tower. The plurality of connection tubes may include a first connection tube. The first connection tube and the container tube may be fluidly coupled to one another to form the first transfer link. The first connection tube and the container tubes may fluidly couple to one another with an aseptic fluid connection system.

In certain embodiments, the tube holding apparatus includes a first guide. The first guide may receive the first transfer link such that the tube holding apparatus maintain a positive slope in the first transfer link. The first guide is adjustable in a vertical direction and a first horizontal direction which is toward and away from the valve tower. The first transfer link may be received in the first guide in a plurality of receives which extend in a second horizontal direction perpendicular to the first horizontal direction.

In particular embodiments, the filling system includes a second storage container supported on the FDS and a second transfer link that fluidly connects the valve tower and the second storage container. The tube holding apparatus may maintain a positive slope in the second transfer link from the storage container to the valve tower. The tube holding apparatus may compensate for differences in length of the first transfer link and the second transfer link.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are not necessarily drawn to scale, which are incorporated in and constitute a part of this specification, wherein.

DETAILED DESCRIPTION

Figure 1:
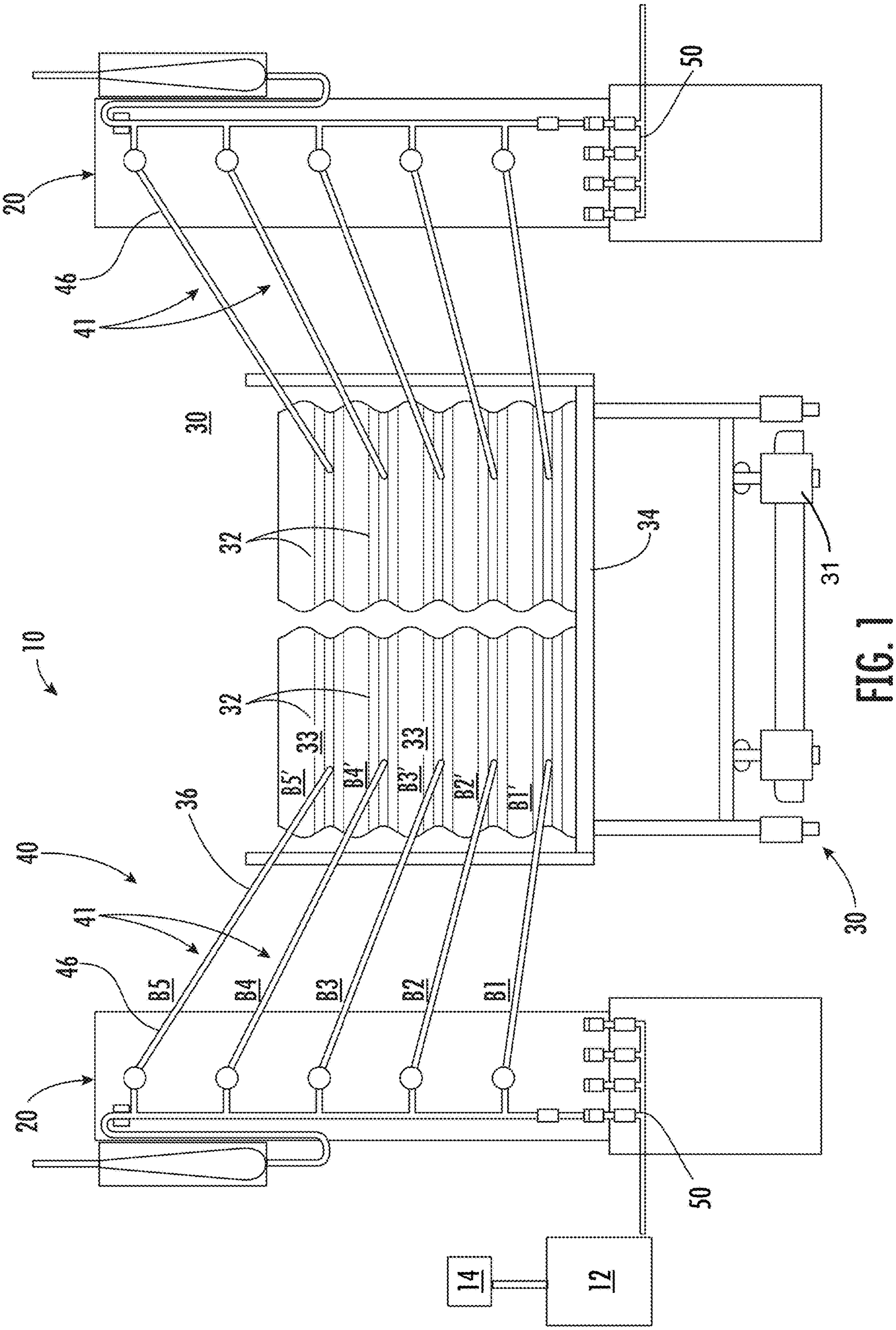
FIG. 1 is a schematic view of a filling system provided in accordance with an embodiment of the present disclosure.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like. Further, as used herein the term "biopharmaceutical compositions" refers to a product coming from biotechnology, culture environments, cell cultures, buffer solutions, artificial nutrition liquids, blood products and derivatives of blood products, a pharmaceutical product, or more generally a product intended to be used in the medical field including, without any limitation, monoclonal antibodies (mAbs), therapeutic proteins, viruses, lipid nanoparticles, vaccines, virus banks, exosomes, cell banks, and cell therapy products.

Referring now to FIG. 1, a schematic of a filling system 10 is provided in accordance with an embodiment of the present disclosure. The filling system 10 includes valve towers 20, a fill and drain station (FDS) 30, and transfer tube sets 40 that extend from the valve towers 20 to the FDS 30. The FDS 30 supports a plurality of storage containers 32 that receive or provide a biopharmaceutical composition. The FDS 30 may support four 75-liter storage containers 32 for a total of 300 liters of biopharmaceutical compositions to be filled and/or drained into or from the storage containers 32. In use, the FDS 30 may be loaded and/or unloaded onto a platform with machinery such as a forklift. In some embodiments, the FDS 30 may have a capacity to support ten storage containers 32 having a volume of 12, 6, 4, or 2 liters each. The FDS 30 may have a capacity to support between one and ten containers having a volume from 2 L to 75 L each. In some embodiments, the FDS 30 may have a capacity greater than 300 L and/or to support more than ten containers. The filling system 10 may include a supply vessel or a plurality of receiver vessels that are in fluid communication with the valve tower. The filling system 10 may include a pump that is configured to flow fluid into or out of the storage containers 32. In some embodiments, the filling system 10 may include sterilizing filters, buffer supply, and buffer waste.

The FDS 30 may include a platform 34 that receives a pallet or structure including one or more storage containers 32 to be filled or drained. The platform 34 may be a weighing platform that measures a weight of a biopharmaceutical composition within the storage containers 32. The platform 34 may be a pallet with multiple storage containers 32 supported above a base.

The valve towers or distribution columns 20 are positioned on opposite sides of the FDS 30. In some embodiments, the filling system 10 may include a single valve tower 20. During filling, the valve towers 20 receive a biopharmaceutical composition and fill the storage containers 32 of the FDS 30 via the transfer tube sets 40. For example, a single valve tower 20 may be used with the FDS 30, e.g., when large storage containers 32 are used. In some embodiments, the FDS 30 may include a valve tower 20 on each side of the FDS 30. For example, two valve towers 20 may be used when small storage containers 32 are supported on the platform 34. The valve towers 20 may be interconnected such that the transfer tube sets 40 of each valve tower 20 are in fluid communication with one another.

The valve towers 20 each include a transfer tube set 40 that fluidly interconnects a supply or distribution vessel with the storage containers 32 supported on the FDS 30. The storage containers 32 may each include a container tube 36 that connects with the transfer tube set 40 to fluidly connect the respective storage container 32 with the transfer tube set 40 such that the transfer tube set 40 is in fluid communication with an interior 33 of the storage container 32. The transfer tube sets 40 include a plurality of connection tubes 46 such that the transfer tube sets 40 has a connection tube 46 for each storage container 32 supported on the FDS 30. Each connection tube 46 is configured to connect with a respective container tube 36 to form a transfer link 41. The transfer link 41 fluidly connects the storage container 32 and the valve tower 20. The connection tubes 46 and the container tubes 36 may aseptically connect with one another such that fluid may be aseptically transferred between the transfer tube set 40 and the storage containers 32 via the transfer link 41. The connection between the connection tubes 46 and the container tubes 36 may be a Opta® connector provided by Sartorius, an AseptiQuik® connector provided by Colder Products, a Kleenpak® Presto Sterile connector provided by Pall Corporation, or another suitable connector.

Continuing to refer to FIG. 1, to fill the storage containers 32, the FDS 30 is positioned between the valve towers 20, or adjacent a single valve tower 20, with a plurality of storage containers 32 supported on the FDS 30. The storage containers 32 are then fluidly coupled to a respective connection tube 46 of a transfer tube set 40 via a container tube 36. With the storage containers 32 in fluid communication with the transfer tube set 40 via the transfer link 41, fluid is provided to the transfer link 41 of each valve tower 20. In embodiments, fluid may be provided to the transfer tube sets 40 via a manifold 50 of the valve tower 20 from a bulk fluid container or supply container. The filling system 10 may include a control tower that include the supply containers and a pump to provide fluid to the manifold 50. As fluid is provided to the transfer tube sets 40, the fluid flows through the transfer links 41 into each of the storage containers 32.

The valve towers 20 may include one or more valves, tubes, flow regulators, or other features to provide an equal amount of fluid to each of the connection tubes 46 and thus, each of the storage containers 32 may be filled sequentially or simultaneously. In some embodiments, the storage containers 32 are filled sequentially with the lowest or bottom storage container 32 being filled first and then the next lowest storage container 32 being filled until each storage container 32 is filled. The storage containers 32 may be filled sequentially in any order. To provide an equal amount of fluid to each of the storage containers 32, it may be necessary to purge or remove air from tubes of the transfer links 41 and/or the storage containers 32 via a priming procedure. It may be beneficial to maintain a positive slope in the transfer link 41 from the respective storage container 32 to the valve tower 20. The positive slope may be constant or increasing. The positive slope may allow air to flow from the storage containers 32 and up the valve towers 20 via the transfer links 41. This positive slope from the storage container 32 to the valve tower 20 may be a negative slope from a connector 45 of the transfer tube set 40 through a connection tube 46 to the respective storage container 32. The slope of the connection tubes may be referred to as tube geometry as discussed below.

The tubes of the transfer links 41, e.g., connection tube 46 and container tube 36, may have differences in tube lengths. In addition, the connectors between the connection tube 46 and the container tube 36 may have different lengths such that the length of the transfer links 41 may vary. In some embodiments, the container tubes 36 may vary depending on the specification. The differences in tube lengths may create problems in maintaining a positive slope from the storage containers 32 to the valve towers 20. For example, manufacturing tolerances in tubing and/or connectors may create a difference in lengths of the transfer links 41 in a range of 0 to 4 centimeters. Some manufacturing tolerances may create a larger difference in lengths of the transfer links 41. The differences in lengths of the transfer links 41 may affect the slope in the transfer links 41. In some embodiments the differences in lengths of the transfer links 41 may be differences in lengths of the connection tubes 46 of the transfer tube set 40.

Different storage containers 32 may change the distance between the valve towers 20 and the storage containers 32. For example, a 75 L storage container may be positioned differently in the FDS 30 as compared to a 1 L storage container. This change in distance may affect the slope in the tube between the storage container 32 and the valve towers 20. While it may be possible to move the valve towers 20 to compensate for this change in distance, the valve towers 20 may be difficult to precisely position. Further, it may be time consuming to reposition the valve towers 20 when the size of storage containers 32 is changed.

Figure 2:
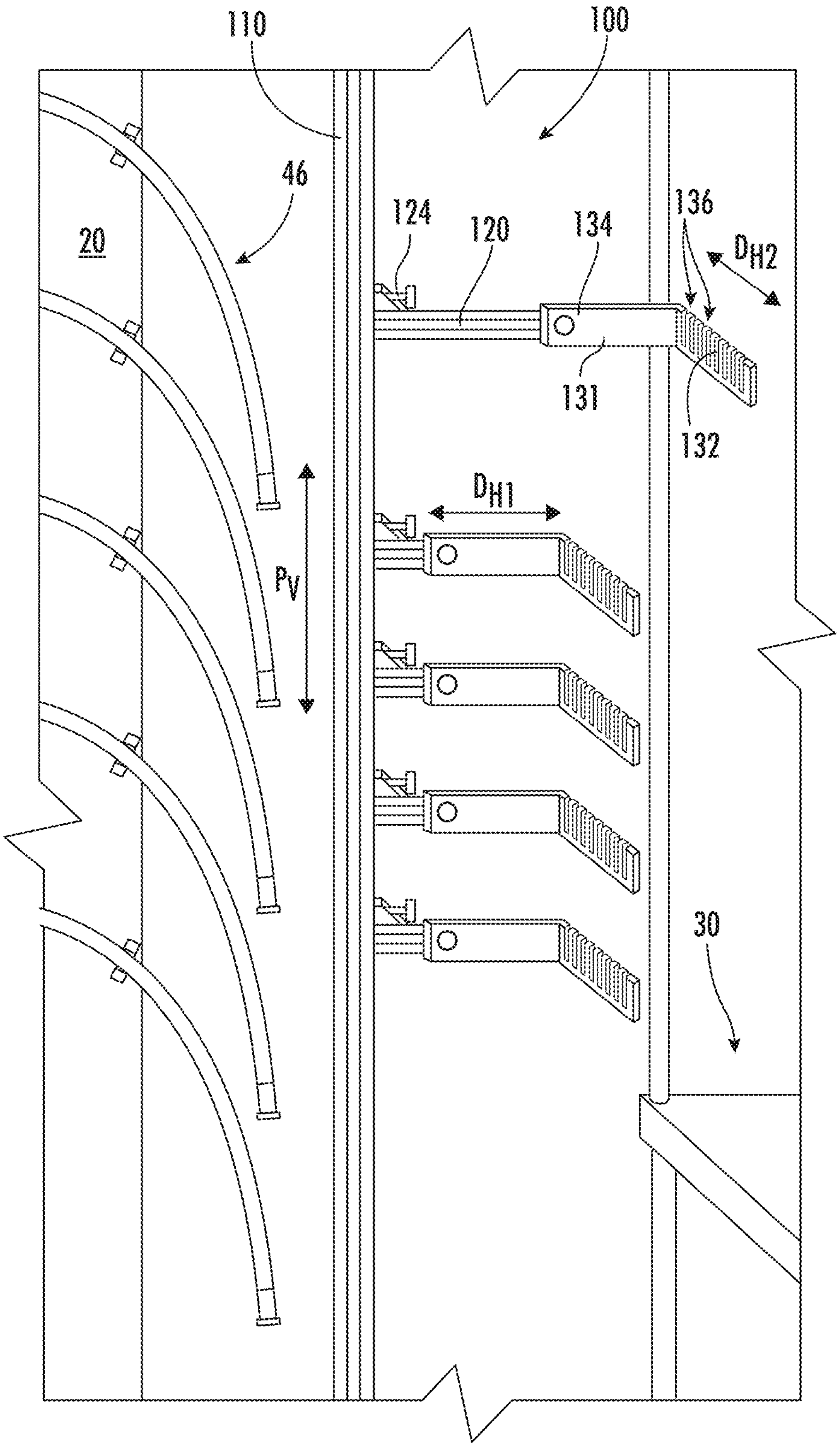
FIG. 2 is a front perspective view of a tube handling apparatus provided in accordance with the present disclosure with a transfer tube set disconnected from storage containers.

Referring now to FIG. 2, a tube holding apparatus 100 for filling multiple containers is provided in accordance with the present disclosure. The tube holding apparatus 100 may compensate for differences in the lengths of the transfer links 41 such that a positive slope is maintained between the storage containers 32 and the valve towers 20. The tube holding apparatus 100 may compensate for a difference in the distance between the valve towers 20 and the storage containers 32 such that a positive slope can be maintained in the transfer links 41 between the storage containers 32 and the valve towers 20.

The tube holding apparatus 100 includes a vertical support 110 and a plurality of arms 120 that extend from the vertical support 110. Each arm 120 includes a guide or comb 132 that receives a portion of the transfer link 41 between the valve tower 20 and the storage container 32, e.g., the connection tube 46 or a container tube 36, to support the transfer link 41 and to adjust a slope of the transfer link 41. The arm 120 may allow for adjustment of the position of the comb 132 vertically $D_V$, in a first horizontal direction $D_{H1}$, and a second horizontal direction $D_{H2}$ perpendicular to the first horizontal direction. Adjustment of the comb 132 allows for adjustment of the slope of the transfer links 41 extending from the valve towers 20 and the storage containers 32.

Each of the plurality of arms 120 may be vertically adjustable along the vertical support 110 to vertically adjust the comb 132. Each arm 120 includes a vertical adjustment mechanism 124 that is configured to selectively fix the vertical position of the arm 120 along the vertical support 110. The vertical adjustment mechanism 124 may engage the vertical support 110 to adjust the vertical position of the arm 120. For example, the vertical adjustment mechanism 124 may rotate in a first direction to raise the arm 120 and rotate in a second direction opposite the first direction to lower the arm 120. In embodiments, the vertical adjustment mechanism 124 includes a fastener or pin that extends through an opening in the vertical support 110 to vertically fix the arm 120 relative to the vertical support 110. In such embodiments, the vertical support 110 may include a plurality of openings at different vertical positions along the vertical support 110 to allow for vertical adjustment of the arm 120. In some embodiments, one or more of the arms 120 may be vertically fixed along the vertical support 110.

Each of the plurality of arms 120 may be a horizontal adjustment mechanism 134 that allows for adjustment of the comb 132 in a first horizontal direction, towards or away from the vertical support along the arm 120. As shown in FIG. 2, when the apparatus 100 is positioned between the valve tower 20 and the FDS 30, the horizontal adjustment mechanism 134 moves the comb 132 horizontally towards and away from the FDS 30. The horizontal adjustment mechanism 134 may include a fastener that is tightened and loosened to allow a sleeve 131 to selectively slide over a portion of the arm 120. In some embodiments, the horizontal adjustment mechanism 134 may rotate in a first direction to move the comb 132 towards the FDS 30 and in a second direction, opposite the first direction, to move the comb 132 away from the FDS 30. The comb 132 may include multiple receivers 136 defined therein at a plurality of positions away from the arm 120. The multiple receivers 136 allow for adjustment in a second horizontal direction which is perpendicular to the first horizontal direction.

Referring now to FIGS. 2-5, a method of filling a plurality of storage containers 32 is described in accordance with the present disclosure. The method includes loading the plurality of storage containers 32 on a FDS 30. The FDS 30 is positioned adjacent a valve tower 20 such that the storage containers 32 are positioned adjacent the valve tower 20. In some embodiments, the FDS 30 is positioned between two valve towers 20. The storage containers 32 may be loaded onto the FDS 30 before or after the FDS 30 is positioned adjacent the valve tower 20. With the storage containers 32 positioned adjacent the valve towers 20, the transfer tube set 40 is fluidly coupled to the storage containers 32 by connecting each connection tube 46 with a respective container tube 36 to form a transfer link 41. As noted above, the tubes 36, 46 may include an aseptic connector to allow for aseptic connection of the connection tubes 46 with the container tubes 36.

With particular reference to FIG. 2, the apparatus 100 is positioned between the valve tower 20 and the FDS 30. When the apparatus 100 is positioned, the combs 132 may be in any position relative to the storage containers 32 or the valve tower 20 such that the combs 132 can be adjusted. The combs 132 are adjusted to provide a positive slope in the transfer links 41 extending between the storage container 32 and the valve tower 20. The positive slope may be an optimum positive slope for particular product or fluid being transferred to the storage containers 32. The adjustment of the combs 132 may be to achieve the optimum positive slope for the particular fluid being transferred to the storage containers 32. As shown, the valve tower 20 may have fixed vertical positions 26 for each of the transfer links 41 of the fluid transfer tube set 40. Without the apparatus 100, the slopes of each of the transfer links 41 extending from the storage container 32 and the valve tower 20 may have negative segments before securing the tubes to a respective comb 132 and adjustment of the combs 132. In some embodiments, the vertical support 110 of the apparatus 100 may be secured to the valve tower 20 or the FDS 30 to prevent movement of the vertical support 110 relative to the valve tower 20 or the FDS 30.

Figure 3:
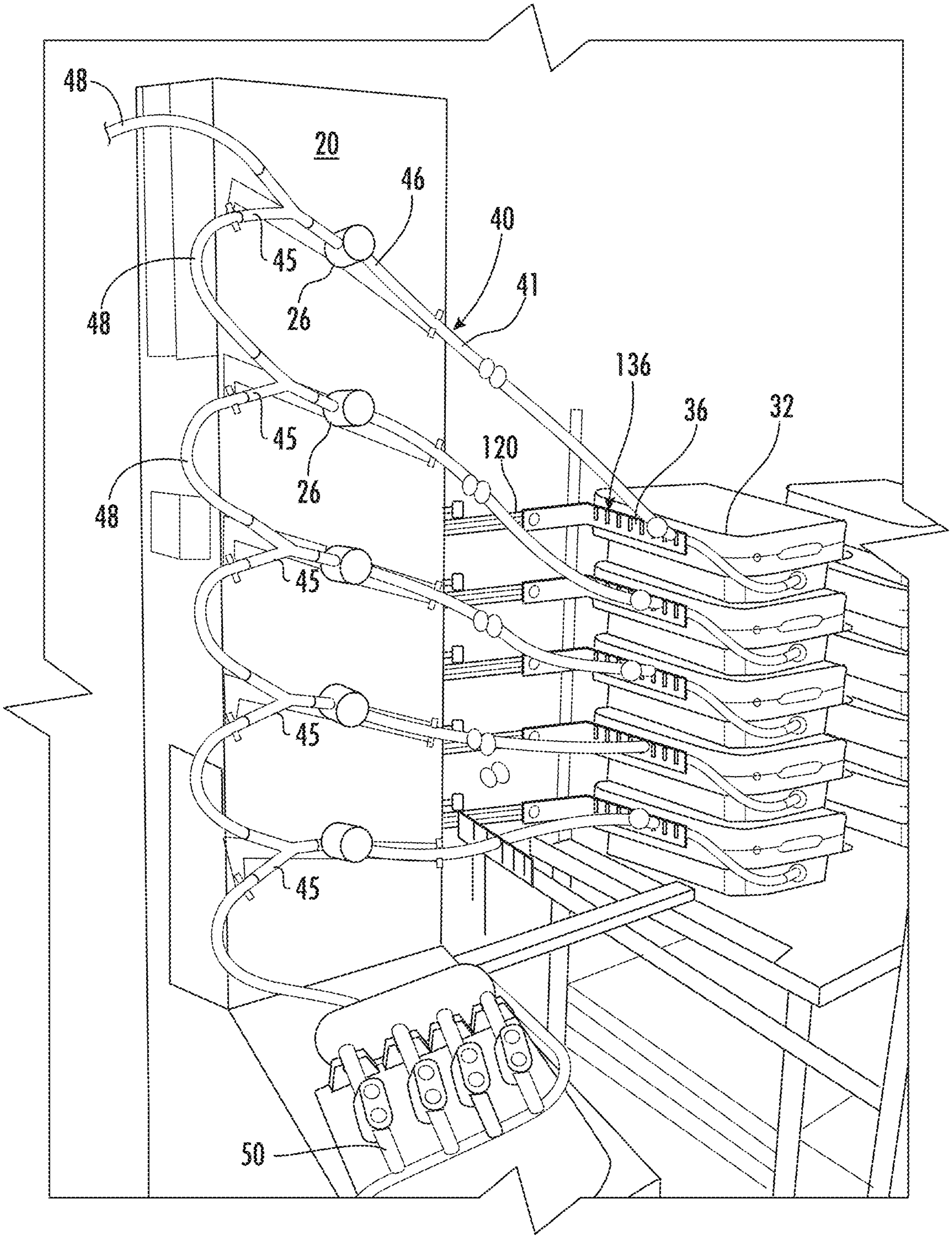
FIG. 3 is another front perspective view of the tube handling apparatus of FIG. 2 with the transfer tube set connected to storage containers supported on the fill and drain station (FDS)
Figure 4:
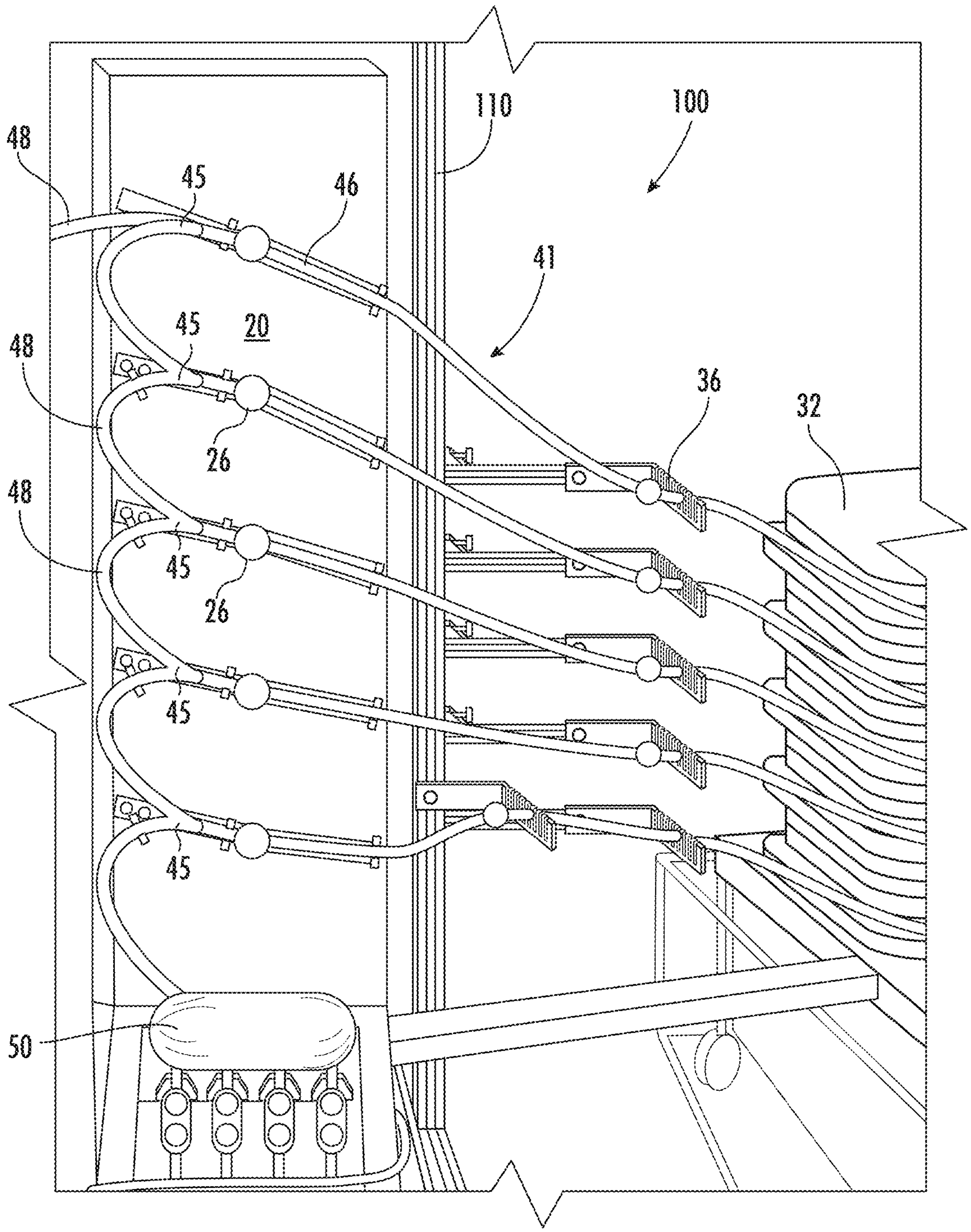
FIG. 4 is a front view of the tube handling apparatus of FIG. 3.
Figure 5:
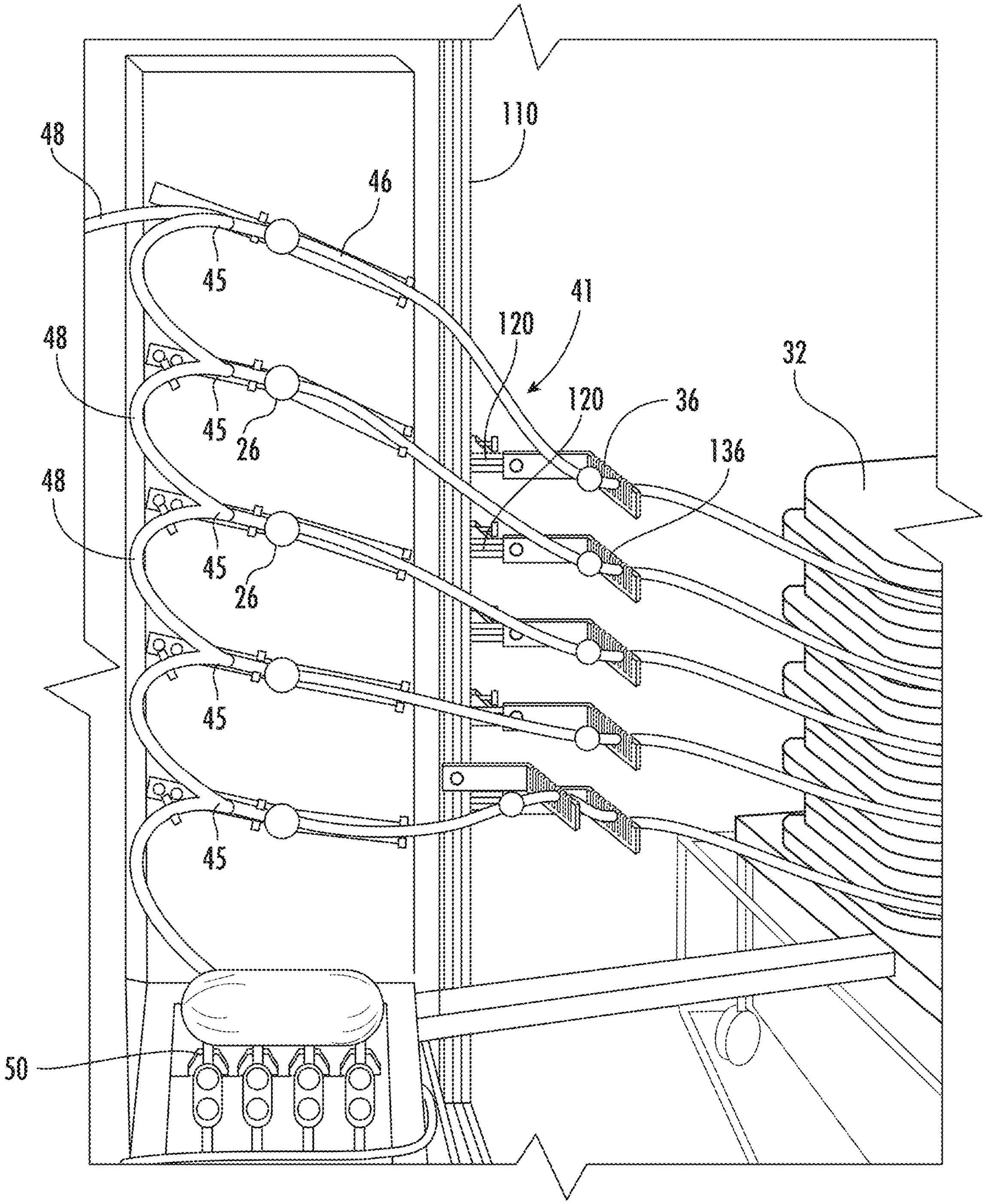
FIG. 5 is another front view of the tube handling apparatus of FIG. 3.

With the apparatus 100 positioned between the valve tower 20 and the FDS 30, the combs 132 are adjusted such that the transfer links 41 have a positive slope from the storage container 32 to the valve tower 20 as shown in FIGS. 3-5. Specifically, the low point of the transfer link 41 is at the storage container 32 and the high point of the transfer link 41 is at the valve tower 20. The slope of the transfer links 41 should be positive such that air flows from the storage container 32 to the valve tower 20. To adjust the combs 132 of the apparatus 100, one of the transfer links 41 is positioned in a receiver 136 of the comb 132 that is aligned with the storage container 32. With the transfer link 41 received in the comb 132, the arm 120 is vertically adjusted such that the comb 132 is above the storage container 32 and below the fixed vertical position 26 of the valve tower 20. The vertical adjustment mechanism 124 may be used to vertically adjust the arm 120. With comb 132 vertically positioned, the comb 132 is horizontally adjusted towards or away from the FDS 30 to set the slope of the transfer link 41. The horizontal adjustment mechanism 134 may be used to horizontally adjust the comb 132. The comb 132 may be horizontally adjusted and vertically adjusted in any order to adjust the slope of the transfer link 41. The slope of the transfer link 41 may be adjusted such that the slope of the transfer link 41 varies but remains positive from the storage container 32 to the valve tower 20.

Once the slope of the transfer link 41 is set, the storage containers 32 may be filled. As the storage containers 32 are filled, air trapped in the storage containers 32 or the transfer link 41 may flow towards the valve towers 20 such that air within the storage containers 32 is minimized. Removing air from the storage containers 32 may allow for a full fill of the storage containers 32. Removing air from the storage containers 32 may increase a life of the biopharmaceutical compositions within the storage containers 32. Removing air from the storage containers 32 may improve freezing of the biopharmaceutical composition stored within the storage containers 32.

When the storage containers 32 are filled, the storage container 32 may be disconnected from the transfer tube set 40 and the storage container 32 may be removed from the FDS 30. A new storage container 32 may be placed on the FDS 30 and connected to the transfer tube set 40. The apparatus 100 may allow for connection of a new storage container 32 without adjustment of the valve towers 20 or the FDS 30 with the apparatus 100 maintaining a positive slope in each of the transfer links 41.

With reference to FIGS. 6-10, another tube holding apparatus 200 for filling multiple containers is provided in accordance with the present disclosure. The tube holding apparatus 200 is secured directly to the fixed vertical positions 26 of the valve towers 20. The tube holding apparatus 200 includes a mount 210, a body 220, a proximal guide 230, and a distal guide 250. The mount 210 secures the body 220 to the valve tower 20. The mount 210 includes a mount body 212 that defines a passage 214 which receives the body 220 therethrough. The mount 210 includes an actuator 216 that passes through the mount body 212 to secure the mount 210 to the valve tower 20. The actuator 216 may fix the orientation of the mount body 212, and thus the body 220, relative to the valve tower 20. The actuator 216 may be configured to be engaged by a hand of a user or by a tool to secure the mount 210 to the valve tower 20.

The body 220 of the apparatus 200 passes through the mount and supports the proximal guide 230 and the distal guide 250. As used herein, the term "proximal" refers to an element or a portion of an element that is closer to the FDS 30 and the term "distal" refers to an element or a portion of an element that is further from the FDS 30. As such, the proximal guide 230 is closer to the FDS than the distal guide 250. The proximal guide 230 and the distal guide 250 receive portions of the transfer link 41 to control a slope of the transfer link 41 such that the transfer link 41 has a positive slope from the respective storage container 32 to the valve tower 20. In embodiments, the body 220 has a circular cross-section. In other embodiments, the body 220 may have a non-circular cross-section such as a semi-circular cross-section. In such embodiments, a flat surface of the body 220 may face the valve tower 20. When the body 220 has a non-circular cross-section, the body may be prevented from rotating in the mount 210.

The proximal guide 230 defines a receiver 232 that receives a proximal portion 223 of the body 220 such that the proximal guide 230 is secured to the body 220. The receiver 232 may allow the body 220 to pass entirely through the proximal guide 230 such that the receiver 232 is positioned along the proximal portion 223 of the body 220. The proximal guide 230 may be positioned anywhere on the proximal portion 223 of the body 220 up to the mount 210. The proximal guide 230 includes a proximal hook 234 that defines a holder 236. The holder 236 receives and supports a portion of the transfer link 41. In some embodiments, the proximal guide 230 is fixed to the body 220.

The distal guide 250 includes a receiver 252 that receives a distal portion 225 of the body 220. The receiver 252 may allow for the distal portion 225 to pass entirely through the distal guide 250 such that the distal guide 250 may be positioned anywhere along the distal portion 225 of the body 220 up to the mount 210. In some embodiments, the receiver and thus the distal guide 250 are fixed relative to the body 220. In certain embodiments, the receiver 252 includes a stop 253 on a distal end thereof such that the distal portion 225 is prevented from passing through the distal guide 250. The distal guide 250 includes a hook 260 and a groove 266. The hook 260 is positioned proximal of the groove 266. The distal guide 250 is configured to receive a distal segment of the transfer link 41 with the hook positioned between tubes of the transfer tube set 40 and the transfer link 41 received in the groove 266. The distal guide 250 may be positioned vertically higher than the proximal guide 230.

Figure 6:
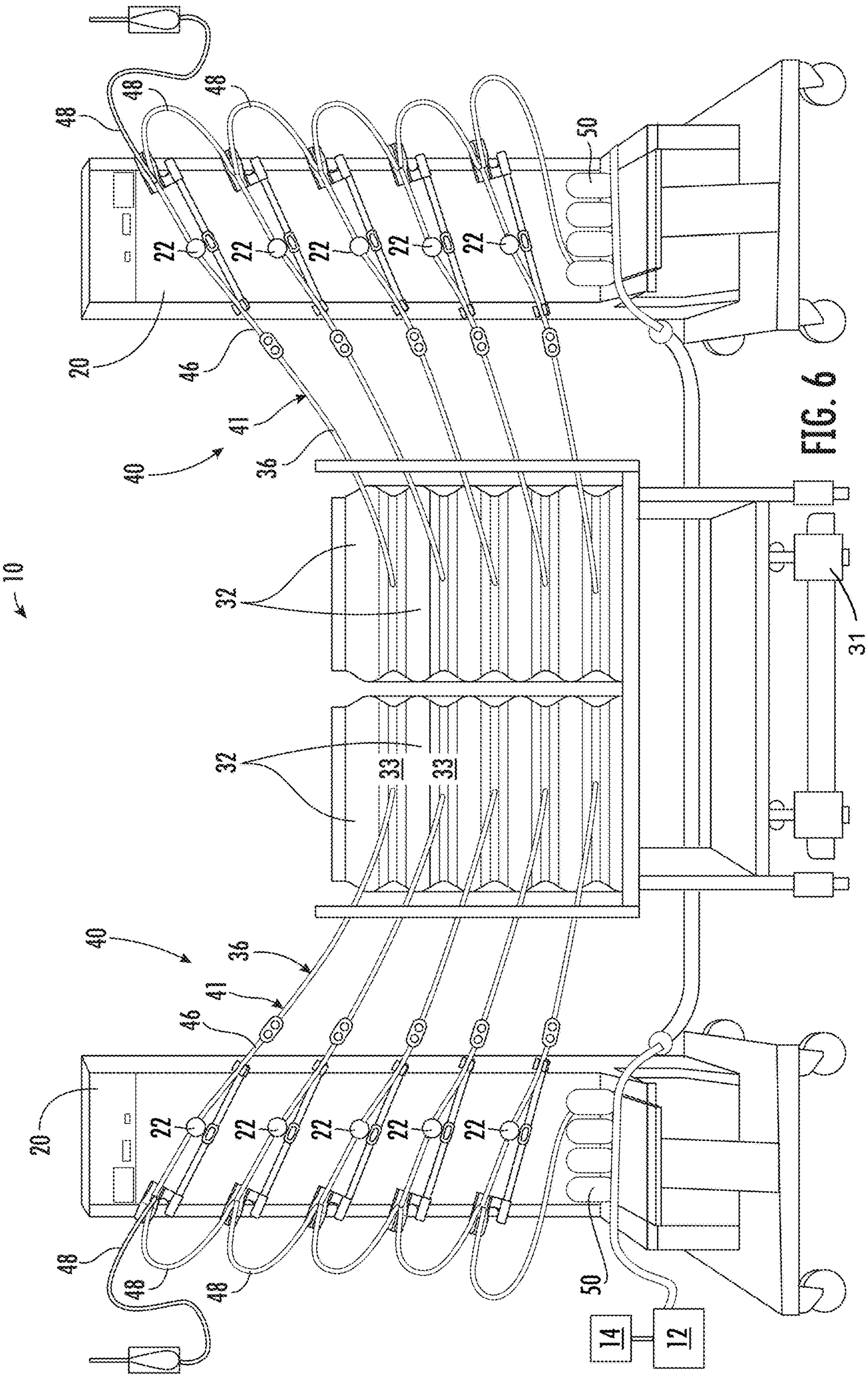
FIG. 6 is front perspective view of another filling system provided in accordance with the present disclosure including another tube handling apparatus.
Figure 7:
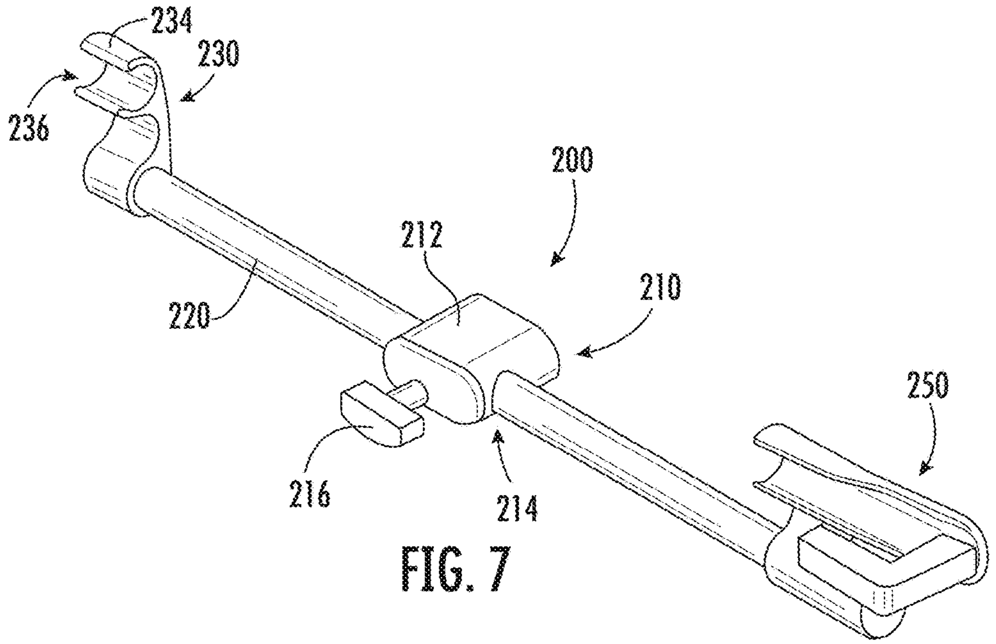
FIG. 7 is a rear perspective view of the tube handling apparatus of FIG. 6.
Figure 8:
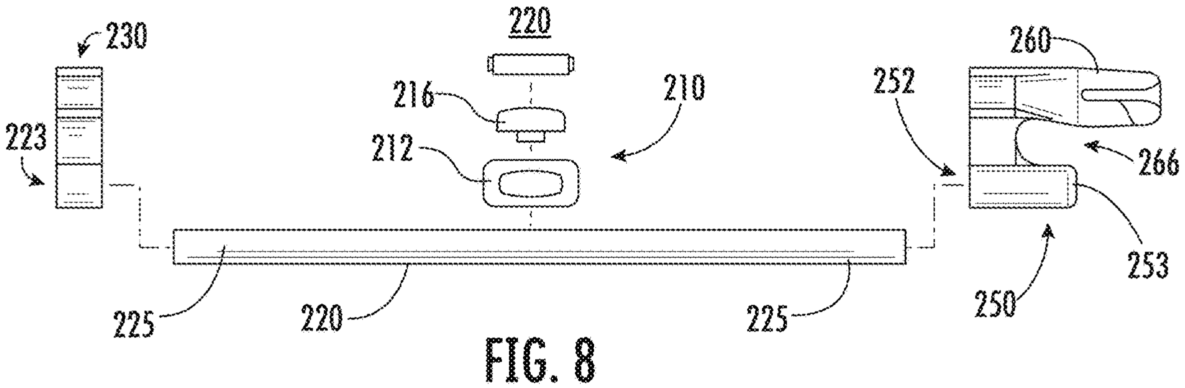
FIG. 8 is a front view of the tube handling apparatus of FIG. 7 with the parts thereof separated from one another.
Figure 9:
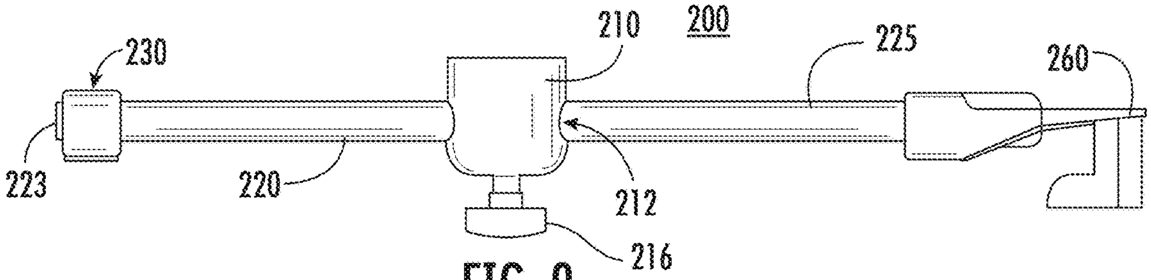
FIG. 9 is a top view of the tube handling apparatus of FIG. 7.
Figure 10:
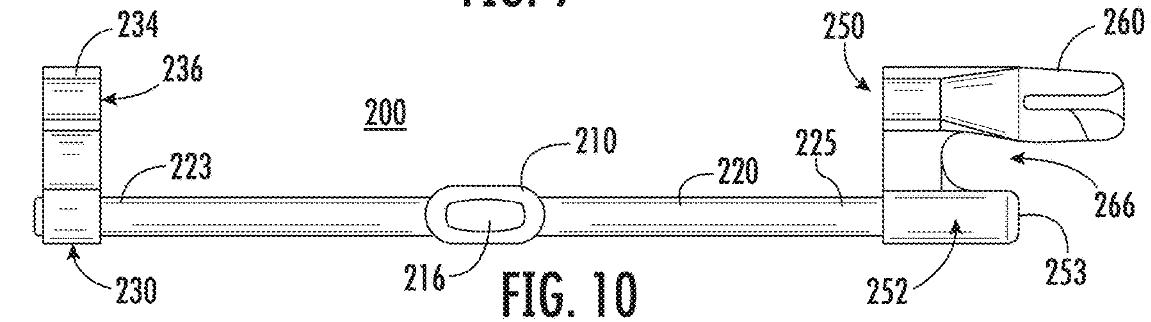
FIG. 10 is a front view of the tube handling apparatus of FIG. 7.

With particular reference to FIG. 6, a method of filling a plurality of storage containers 32 is described in accordance with the present disclosure. The method includes loading the plurality of storage containers 32 on a FDS 30. The FDS 30 is positioned adjacent a valve tower 20 such that the storage containers 32 are positioned adjacent the valve tower 20. In some embodiments, the FDS 30 is positioned between two valve towers 20. The storage containers 32 may be loaded onto the FDS 30 before or after the FDS 30 is positioned adjacent the valve tower 20.

The valve towers 20 include an apparatus 200 mounted at each level of the valve tower 20. In some embodiments, the method includes mounting an apparatus 200 at each level of the valve tower 20. With the apparatus 200 mounted at each level of the valve tower 20, the transfer tube set 40 may be positioned on the apparatuses 200. Specifically, a proximal segment of a respective connection tube 46 is positioned in the holder 234 of the proximal guide 230 and a distal segment of the respective connection tube 46 is positioned in the distal guide 250 of the same apparatus 200. The distal segment of the connection tubes 46 may terminate in a Y-connection that has two interlink tubes 48 that fluidly interconnects the distal segments of the connection tubes 46 to form the transfer tube set 40. The mount of the distal segments of the connection tubes 46 in the distal guide 250 may fix the distal segment of the connection tube 46 in the distal guide 250.

With the proximal and distal segments of the connection tube 46 received in the apparatus 200 and the storage containers 32 positioned adjacent the valve towers 20, the transfer tube set 40 is fluidly coupled to the storage containers 32 by connecting each connection tube 46 with a respective container tube 36 to form a transfer link 41. As noted above, the tubes 36, 46 may include an aseptic connector to allow for aseptic connection of the connection tubes 46 with the container tubes 36.

With a transfer link 41 received in each of the apparatuses 200, the apparatus 200 are each adjusted to remove slop or slack in the transfer links 41. To adjust the apparatuses 200, the body 220 is translated through the mount 210 to position the distal guide 250 of the apparatus 220 relative to the valve tower 20. Specifically, the actuator 216 may be rotated in a first direction to allow the body 220 to translate relative to the mount 210 and rotated in a second direction to fix the body 220 relative to the mount 210. Positioning the distal guide 250 of the apparatus 220 may remove slop from the transfer link 41 when the distal guide 250 is moved distally and may allow additional slop in the transfer link 41 when the distal guide 250 is moved proximally. In some embodiments, the body 220 may be rotated about the mount 210 to change the orientation of the body 220 relative to the valve tower 20. The proximal mount 230 may be translated along the body 220 to control the slope of the transfer link 41 and/or remove slack in the transfer link 41.

Once each of the apparatus 200 are adjusted such that the slopes of the transfer links 41 are set to be positive between the storage containers 32 and the valve towers 20, the storage containers 32 may be filled. As the storage containers 32 are filled, air trapped in the storage containers 32 or the transfer link 41 may flow towards the valve towers 20 such that air within the storage containers 32 is minimized. Removing air from the storage containers 32 may allow for a full fill of the storage containers 32. Removing air from the storage containers 32 may increase the life of the biopharmaceutical compositions within the storage containers 32. Removing air from the storage containers 32 may improve freezing of the biopharmaceutical composition stored within the storage containers 32.

When the storage containers 32 are filled, the storage container 32 may be disconnected from the transfer tube set 40 and the storage container 32 may be removed from the FDS 30. New storage containers 32 may be placed on the FDS 30 and connected to the transfer tube set 40 to be filled without repositioning the apparatuses 200. The apparatus 200 may allow for connection of a new storage containers 32 without adjustment of the valve towers 20 or the FDS 30 with the apparatuses 200 maintaining a positive slope in each of the transfer links 41.

The apparatuses 100, 200 detailed herein may reduce risk of the transfer tube set 40 being damaged during setup, filling, or takedown of the system. The apparatuses 100, 200 may allow for a predetermined footprint of the valve towers 20 and the FDS 30 with the apparatuses 1000, 200 compensating for differences in the length of the transfer links 41 between the valve towers 20 and the storage containers 32. The apparatuses 100, 200 may be used to maintain a minimum slope in the transfer links 41 to purge air from the storage containers 32. The minimum slope may be an optimum positive slope that is determined by the product or biopharmaceutical composition being transferred or filled. In some embodiments, the valve towers 20 may include purge bags that are configured to capture air from the storage containers 32 and the transfer links 41.

Figure 11:
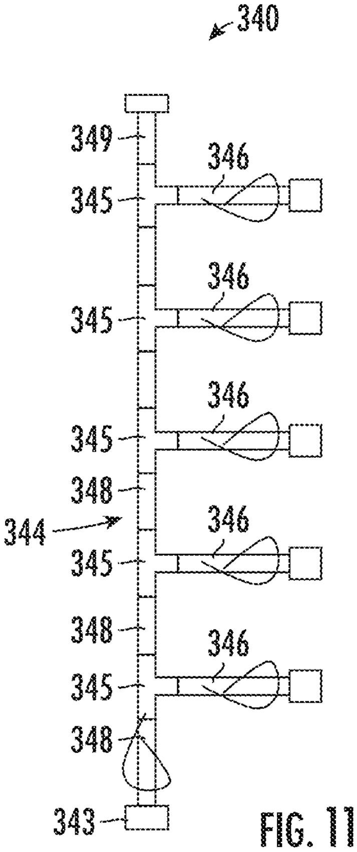
FIG. 11 is a model of another transfer tube set provided in accordance with the present disclosure.

Referring now to FIG. 11, a transfer tube set 340 is provided in accordance with embodiments of the present disclosure. The transfer tube set 340 may be used with a filling system and/or valve tower, e.g., filling system 10 or valve tower 20, as detailed above to prime and fill storage containers with a biopharmaceutical composition. The transfer tube set 340 includes connection tubes 346 that form links with the storage containers to fluidly connect the storage containers as detailed above. The geometry of the connection tubes 346 may be maintained by a tube holding apparatus, e.g., tube holding apparatus 100, 200.

The transfer tube set 340 includes a riser 344 that includes an inlet 343 at a first or bottom end and an outlet 349 at a second or top end. The inlet 343 may be configured to fluidly connect the riser 344, and thus the connection tubes 346, with a manifold, e.g., manifold 50, such that fluid flows from the manifold into the riser 344. The outlet 349 may include a vent filter that allows air or gas to exit the riser 340 and prevent fluid from exiting the riser 340. The outlet 349 may be open to an environment surrounding the filling system such that the outlet 349 allows air or gas to freely exit the filling system. The outlet 349 may include an aseptic vent filter to allow air or gas to freely exit the filling system while preventing contamination of fluid within the filling system. The environment surrounding the filling system may be a sterile or non-sterile environment. In some embodiments, the riser 340 includes a bubble trap 360 upstream of the outlet 349.

The riser 340 includes interlink tubes 348 and connectors 345. Each connector 345 is associated with a respective one of the connection tubes 346 to fluidly connect two of the interlink tubes 348 with a respective one of the connection tubes 346. As shown, the interlink tubes 348 form a substantially vertical portion of the riser 344 with the connectors 345 positioned between the interlink tubes 348. A first interlink tube 348 extends from the inlet 343 to a first connector 345 which fluidly connects to a first connection tube 346. A second interlink tube 348 extends from the first connector 345 to a second connector 345 which fluidly connects to a second connection tube 346. A third interlink tube 348 extends from the second connector 345 to a third connector 345 which fluidly connects to a third connection tube 346. A fourth interlink tube 348 extends from the third connector 345 to a fourth connector 345 which fluidly connects to a fourth connection tube 346. A fifth interlink tube 348 extends from the fourth connector 345 to a fifth connector 345 which fluidly connects to a fifth connection tube 346. A sixth interlink tube 348 extends from the fifth connector 345 to the outlet 349 and may include the bubble trap 360. In embodiments, the riser 344 may include less than six interlink tubes 348 and less than five connection tubes or may include more than six interlink tubes 348 and more than five connection tubes 346.

Figure 12:
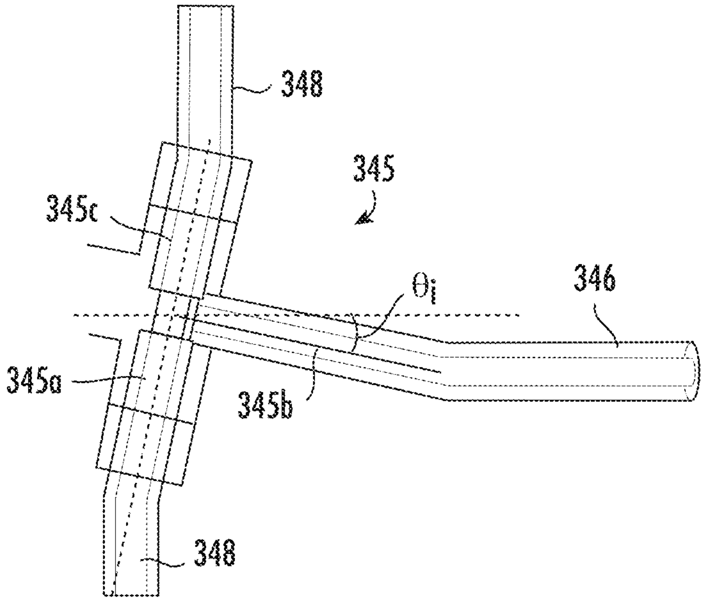
FIG. 12 is an enlarged view of a connector of the transfer tube set of FIG. 11.

With additional reference to FIG. 12, each connector 345 includes interlink portions 345*a*, 345*c* that are substantially aligned or coaxial with one another with a connection portion 345*b* extending substantially perpendicular from the interlink portions 345*a*, 345*c*. When the interlink portions 345*a*, 345*c* are coaxially aligned with one another, a central longitudinal axis of each interlink portion 345*a*, 345*c* coaxially aligned with one another. The connector portion 345*b* defines a central longitudinal axis that extends substantially perpendicular to the central longitudinal axes of the interlink portions 345*a*, 345*c*.

Each interlink portion 345*a*, 345*c* is configured to fluidly couple to a respective interlink tube 348 and the connection portion 345*b* is configured to fluidly couple to a respective connection tube 346. In some embodiments, the tube geometry of the connector 345 is in a vertically aligned orientation with the interlink portions 345*a*, 345*c* extending substantially vertically and the connection portion 345*b* extending in a substantially horizontal direction from the interlink portions 345*a*, 345*c*. In certain embodiments, the tube geometry of the connector 345 may be in an angled orientation such that the connection portion 345*b* is angled downward from horizontal at an inclination angle $\theta_i$ in a range of 5 degrees to 35 degrees, e.g., 10 degrees to 35 degrees, 10 degrees to 15 degrees, 10 degrees, or 15 degrees, as shown in FIG. 12. It will be appreciated that in the angled orientation, the interlink portions 345*a*, 345*c* are offset from vertical at the inclination angle. The angled tube geometry of the connector 345 may improve priming of storage containers fluidly coupled to the connection tubes 346. The angles may be measure relative to the respective central longitudinal axes.

The transfer tube sets 340, 440 are shown with fluid control devices in the form of clamps that selectively close or pinch a lumen defined by the interlink tubes 348, 448, the connection tubes 346, 448, or the connectors 345, 445. The fluid control devices may be any suitable fluid control device including a pinch clamp, e.g., pinch valves 22, a valve, a rotary clamp, Quickseals or other clamp or valve capable of selectively close a lumen defined by a respective tube. In embodiments, each interlink tube 348, 448, each connection tube 346, 448, or each connector 345, 445 may include a fluid control device. In certain embodiments, fluid control devices are disposed about the transfer tube set 340, 440 based on the application and the status of priming or filling of the transfer tube set 340, 440 or the storage containers. In some embodiments, fluid control devices may be located on portions of the storage containers or the risers.

Figure 13:
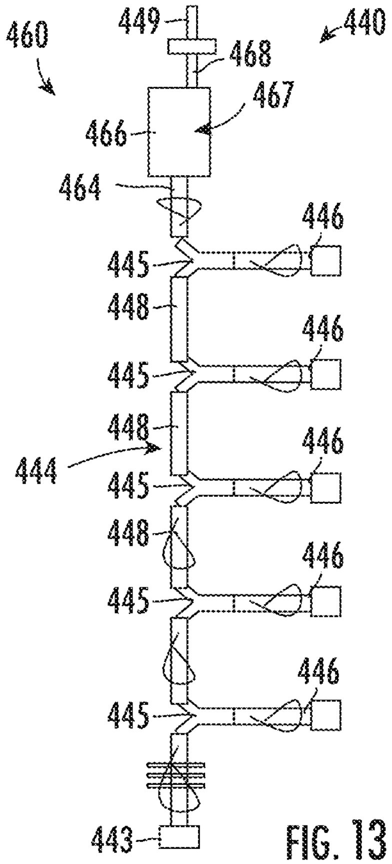
FIG. 13 is a model of another transfer tube set provided in accordance with the present disclosure.
Figure 14:
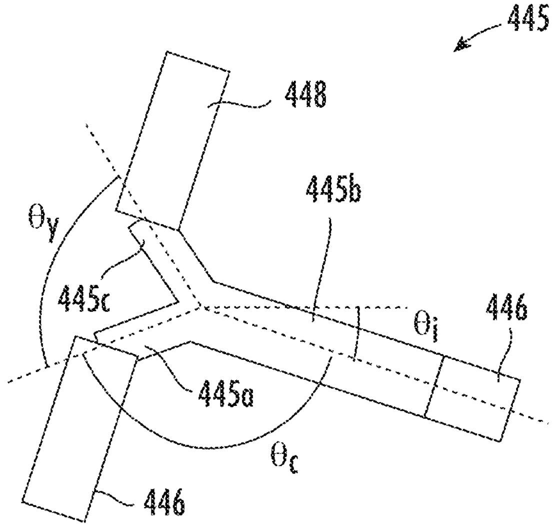
FIG. 14 is an enlarged view of a connector of the transfer tube set of FIG. 13.

With reference to FIGS. 13 and 14, another transfer tube set 440 is provided in accordance with embodiments of the present disclosure. The transfer tube set 440 may be used with a filling system and/or valve tower, e.g., filling system 10 or valve tower 20, as detailed above to prime and fill storage containers with a biopharmaceutical composition. The transfer tube set 440 includes connection tubes 446 that form links 441 with the storage containers. The transfer tube set 440 includes connection tubes 446 that form links with the storage containers to fluidly connect the storage containers as detailed above. The geometry of the connection tubes 446 may be maintained by a tube holding apparatus, e.g., tube holding apparatus 100, 200.

The transfer tube set 440 includes a riser 444 that includes an inlet 443 at a first or bottom end and an outlet 449 at a second or top end. The inlet 443 may be configured to fluidly connect the riser 444, and thus the connection tubes 446, with a manifold, e.g., manifold 50, such that fluid flows from the manifold into the riser 444. The outlet 449 may include a vent filter that allows air or gas to exit the riser 444 and prevent fluid from exiting the riser 444. In some embodiments, the riser 444 includes a bubble trap 460 upstream of the outlet 449. The transfer tube set 440 is similar to the transfer tube set 340 detailed above with the leading "4" replacing the leading "3" with only the differences detailed herein for reasons of brevity.

The interlink tubes 448 have a length greater than the vertical distance between the valves 22 of the valve tower 20 (FIG. 6) such that the interlink tubes 448 have a C or a U shape between adjacent connectors 445. For example, when the valves 22 of the valve tower 20 are vertically separated by 19 cm or 20 cm, the interlink tubes 448 between adjacent connectors 445 have a length in a range of 25 cm to 35 cm, e.g., 28 cm to 32 cm, or 30 cm. This length greater than the vertical distance may be expressed as the length of the interlink tubes 448 being in a range of 130 percent to 180 percent, e.g., 150 percent, of the vertical distance between the valves 22 or adjacent connectors 445. The C or U shape may improve the priming and/or the fill of the containers with the transfer tube set 440.

The connectors 445 are Y-shaped with the interlink portions 445*a*, 445*c* extending at an angle from the connection portion 445*b*. The interlink portions 445*a*, 445*b* may define an angle $\theta_y$ therebetween that is less than 130 degrees which is measured between the central longitudinal axes of the interlink portions 445*a*, 445*c*. For example, the angle $\theta_y$ between the interlink portions 445*a*, 445*c* may be in a range of 30 degrees to 130 degrees, e.g., 30 degrees, 45 degrees, 60 degrees, 75 degrees, 90 degrees, or 120 degrees. The connector 445 may be in a vertically aligned orientation with the connection portion 445*b* extending substantially horizontal direction or an angled orientation in which the connection portion 445*b* is angled downward from horizontal at an inclination angle $\theta_i$ in a range of 5 degrees to 35 degrees, e.g., 10 degrees to 35 degrees, 10 degrees to 15 degrees, 10 degrees, or 15 degrees, as shown in FIG. 14. The connection portion 445*b* may be offset from one or both of the interlink portions 445*a*, 445*c* by an angle $\theta_c$ which is in a range of 115 degrees to 165 degrees, e.g., 135 degrees or 150 degrees.

The connectors 445 increase the length of the riser 444 of the transfer tube set 440 compared to the riser 344 of the transfer tube set 340. The angle of the interlink portion 445*a* may direct fluid flowing from the inlet 443 towards the connection portion 445*b* such that the fluid is more likely to flow into the connection tube 446 than towards the interlink portion 445*c*. The increase in the length of the riser 440 and/or the angle of the interlink portion 445*a* of the connector 445 may promote filling of the connection tubes 446 and the storage containers connected thereto.

Figure 15:
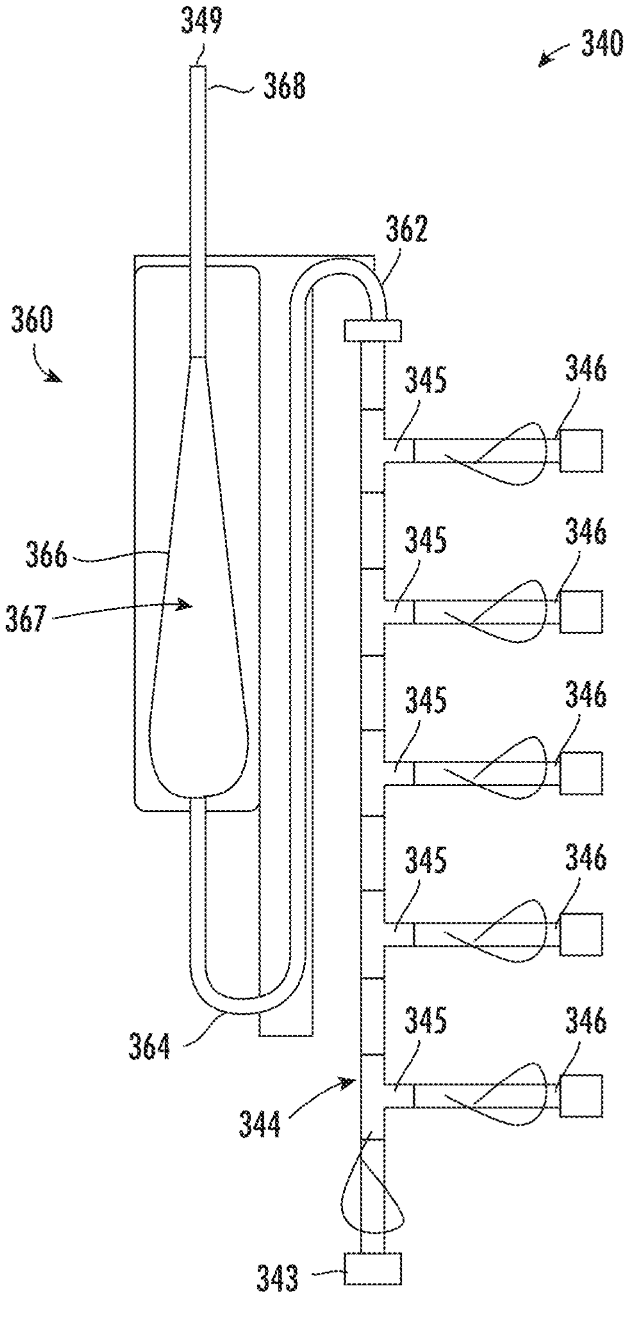
FIG. 15 is a model of another transfer tube set provided in accordance with the present disclosure.

Referring to FIG. 15, the transfer tube set 340 includes the bubble trap 360 that is downstream of the last or top connector 345 and upstream of the outlet 349. The bubble trap 360 includes, from downstream to upstream, a leading or entry segment 362, a trap segment 364, a bulb 366, and a trailing or vent segment 368. The entry segment 362 is disposed above the trap segment 364 such that fluid entering the bubble trap 360 must flows downward via gravity from the entry segment 362 to the trap segment 364. The trap segment 364 forms the lowest-most part of the bubble trap 360. The trap segment 364 flows into the bottom of the bulb 366. The bulb 366 defines a chamber 367 that has a large volume to receive fluid during priming and filling of storage containers with the riser 340. As shown, the bulb 366 is substantially conical or frustoconical in shape with a large diameter at the base or bottom and a smaller diameter at the tip or top. The bulb 366 can have any shape such that the chamber 367 has a volume large enough to contain fluid that passes into the bulb 366. For example, the bulb 366 may be rectangular, pyramidal, or spherical in shape. In some embodiments, the bulb 366 is in the form of a bag or a rigid container. The volume of the chamber 367 may be large enough to capture an adequate amount of fluid to fully prime the storage containers. The volume of the chamber 367 may be in a range of 100 mL to 3000 mL, e.g., 200 mL, 250 mL, 500 mL, 1000 mL, 1500 mL, 2000 mL, or 2500 mL. The entire bulb 366 is disposed above the trap segment 364. The vent segment 368 extends from the tip or top of the bulb 366 to the outlet 349 of the riser 340. The vent segment 368 may include a vent filter that allows from air or gas to pass through the vent filter and prevents liquid from passing through the vent filter. The vent filter may be a hydrophobic filter. The volume of the chamber 367 may be sized to accommodate a volume of fluid during priming to prevent fluid from contacting the vent filter. The use of the bubble trap 360 may allow for capture of fluid used for priming the riser 340. In some embodiments, fluid contacting the vent filter may contaminate the fluid such that the fluid may need to be discarded. The fluid captured in the bulb 366 may be used to recover the fluid for a future use such that the recovered fluid is not discarded or considered waste.

As discussed herein, the transfer tube sets discussed herein, e.g., transfer tube sets 40, 340, 440, are used to prime and fill storage containers with fluid and may be used to recover fluid from priming. As detailed below, several aspects of the transfer tube sets 40 were evaluated to determine the effect of different aspects on the efficacy and repeatability or robustness of the priming and filling of storage containers. Specifically, computational fluid dynamics was used to model the system in both two dimensions and three dimensions to determine the effect of different aspects of the transfer tube sets 40. In addition, the modeled results were confirmed with several experimental runs. For example, a geometry of the connection tubes 446, the type of the connector (e.g., T-connector 345 or Y-connector 445), inclination angle, fluid viscosity, wall roughness, and type of flow were each modeled.

Figure 16:
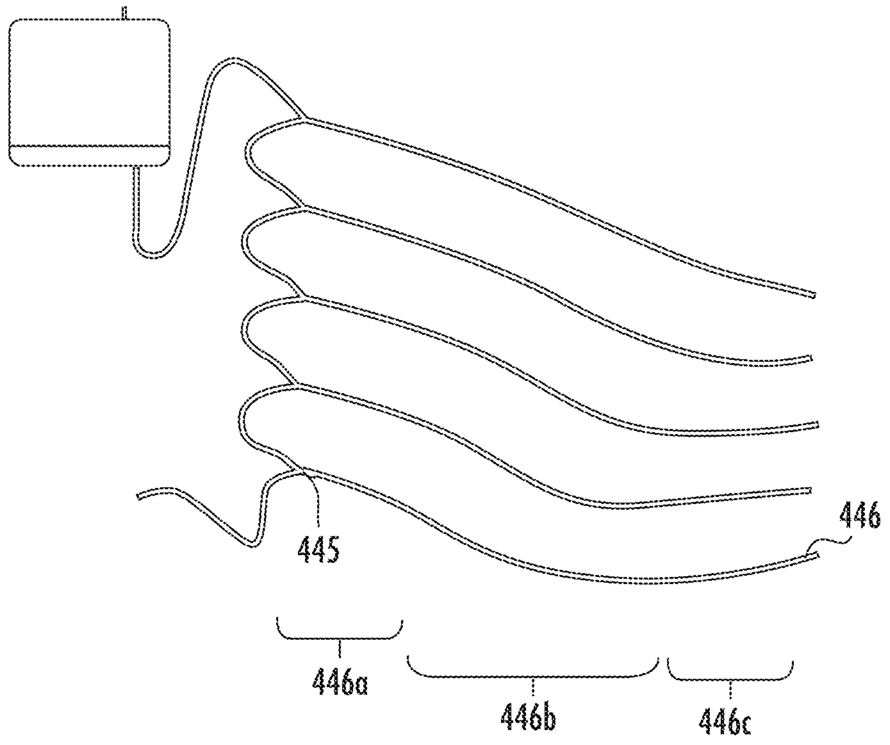
FIG. 16 is a model of a first geometry of a transfer tube set provided in accordance with the present disclosure.
Figure 17:
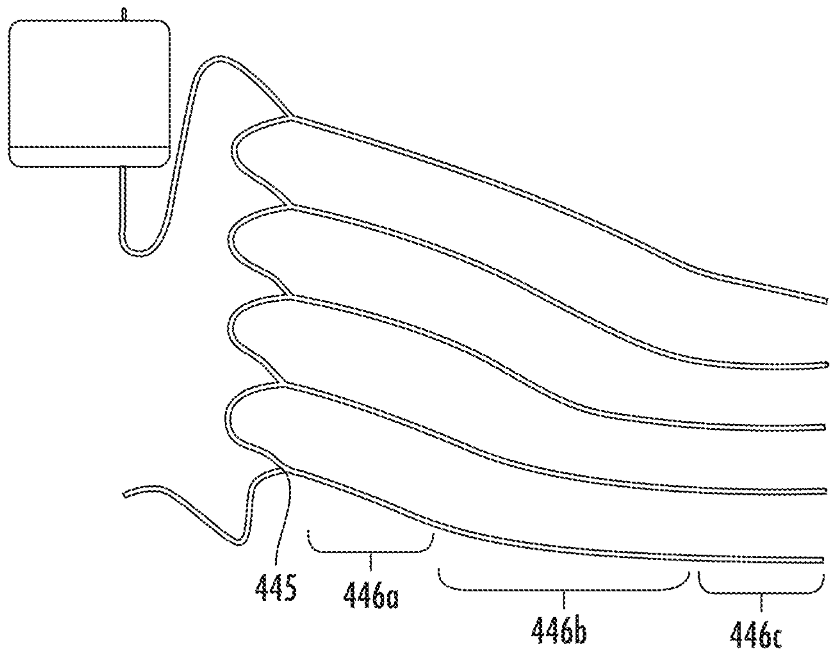
FIG. 17 is a model of a second geometry of a transfer tube set provided in accordance with the present disclosure.

With reference to FIGS. 16 and 17, the two geometries of the connection tubes 446 are shown. The first geometry, shown in FIG. 16, illustrates a geometry of the connection tubes 446 where the connection tubes 446 may dip such that a middle segment 446*b* of one or more of the connection tubes 446 is below an end segment 446*c* of the connection tube 446. As shown in FIG. 16, the end segment 446*c* may trap air bubbles after priming. This dip may cause a portion of the connection tube 446 to have a positive slope from the connector 445 to the end segment 446*c* of the connection tube 446. The second geometry, shown in FIG. 17, the connection tubes 446 have a negative slope from the connector 445 through the end segment 446*c* such that any air trapped in the connection tube 446 passes from the connection tube 446 into the riser 444. From the modeling, it was found that the geometry of the connection tubes 446 is a significant factor in the priming of the transfer tube set 440. For example, with the first geometry, air was frequently trapped in the connection tubes such that incomplete priming was frequent. In addition, during priming, the amount of fluid captured in the bubble trap, the fill percentage, was higher for the first geometry than the second geometry. The second geometry was found to allow for full priming of the transfer tube set such that all air is removed from the transfer tube set upstream of the bubble trap.

The tubes of the transfer sets 340, 440 detailed above, e.g., interlink tubes 348, 448, tubes of connectors 345, 445, and connection tubes 346, 446, may have a diameter sufficient to allow fluid to flow through the tubes without obstruction while allowing the fluid control devices to selectively close the respective tube by pinching or clamping the tube to close the tube. In embodiments, all of the tubes of a transfer tube set 340, 440 have the same diameter.

Alternatively, the diameters of the tubes of the transfer tube set 340, 440 may differ from one another based on the type of the tube, e.g., interlink, connector, or connection, and/or the position of the tube within the transfer tube set, e.g., for the first storage container or the last storage container. For example, a connection tube may have a smaller diameter than the interlink tubes. In certain embodiments, the diameter of the interlink tubes adjacent the first or lowest connector may be large than the interlink tubes adjacent the last or uppermost connector. The tubes of the transfer sets 340, 440 may have an outer diameter in a range of 3⁄16 inches (4.8 mm) to ¾ inches (19 mm), e.g., 3⁄16 inches (4.8 mm), ¼ inches (6.3 mm), 5⁄16 inches (7.9 mm), ⅜ inches (9.5 mm), 7⁄16 inches (11.1 mm), ½ inches (12.7 mm), 9⁄16 inches (14.2 mm), ⅝ inches, (15.8 mm), 11⁄16 inches (17.4 mm), or ¾ inches (19 mm). The inner diameter of the tubes of the transfer tube sets 340, 440 may be common diameters based on outer diameter of the respective tube.

It is noted that the tube holding apparatuses detailed above, e.g., tube holding apparatus 100 or tube holding apparatus 200, may be used to maintain the connection tubes 446 in the second geometry. In some embodiments, the length of the connection tubes 446, the position of the storage containers, or other factors may be used to maintain the connection tubes 446 in the second geometry during priming or filling operations.

Another aspect of the transfer tube sets that were modeled were the type of connector. Specifically, a T-connector 345 (FIGS. 11 and 12) and a Y-connector 445 (FIGS. 13 and 14) were modeled. In the models, with all other aspects maintained, the T-connector 345 and the Y-connector 445 had similar priming times to achieve full priming of the connection tubes. However, the fill percentage of the bubble trap was significantly greater for the T-connector 345 when compared to the Y-connector 445 such that the Y-connector 445 outperformed the T-connector 345. For example, in some models, the fill percentage for the T-connector 345 was double the fill percentage with the Y-connector 445. In addition, both the time to prime and the fill percentage of the bubble trap were consistent for the Y-connector 445 to achieve a full priming of the connection tubes. In contrast, the time to prime and the fill percentage of the bubble trap with the T-connector 345 varied for each run of the model. As such, the models indicate that the Y-connector 445 provided robust and repetitive results. When the connectors were tested experimentally, these results were confirmed showing that the Y-connector 445 provided consistent priming with repeatable priming times and fill percentages of the bubble trap. For example, the Y-configuration achieved a full prime in less than 150 seconds 96 percent of the time with only one priming failure. In contrast, priming with the T-connector 345 took longer and was less consistent with full priming occurring in less than 210 seconds 62 percent of the time with priming failures occurring in a range of 270 seconds to 360 seconds. It is noted that the one priming failure of the Y-connector 445 may have been attributable to tube geometry and not the connector. In addition, in the experiments, the Y-connector 445 achieved a full prime with less than 10 percent of the fluid in the bubble trap compared to the T-connector 345. Specifically, in the experiments, a full prime was achieved with the Y-connector 445 with 51 mL of fluid in the bubble trap compared to 640 mL in the bubble trap for full primes with the T-connector 345.

Another aspect of the transfer tube set that was modeled was the inclination angle $\theta_i$ of the connector. As detailed above, the inclination angle $\theta_i$ of the connector is the angle of the connection portion downward from horizontal. The model tested inclination angles $\theta_i$ of 10, 15, 20, and 30 degrees. From the model, both the prime time and the fill percentage of the bubble trap appeared to decrease as the inclination angle increased. It is noted that as the inclination angle changes, the tube geometry may also be modified.

Still another aspect of the transfer tube set that was modeled was the viscosity of the fluid being distributed. The model tested fluids having a viscosity of 1 centipoise (cP), 10 cP, 75 cP, and 100 cP through the same transfer tube set. In the models, all of the fluid viscosities achieved full priming with the 1 cP and the 10 cP fluids performing with similar priming times and fill percentages of the bubble trap. The 75 cP fluid had a prime time and a fill percentage of the bubble trap each about double that of the 1 cP and the 10 cP fluid. The 100 cP fluid further increased the prime time but greatly increased the fill percentage of the bubble trap, e.g., 10 times greater than the 75 cp fluid, but still achieved a full prime. As such, the 100 cP fluid may be near the upper limit of fluid viscosity for the modeled transfer tube set. However, increasing the tube diameter or other aspects of the transfer tube set may extend the range of fluid viscosities above 100 cP if needed for particular applications. It was also noted that as the viscosity of the fluid increased, a decrease in the flow rate of the fluid improved efficiency of the priming.

The wall roughness and the type of flow of the fluid (e.g., laminar, transitional, or turbulent) were also evaluated. However, wall roughness and type of flow of the fluid appeared to have little effect on the prime time or the fill percentage of the bubble trap. In addition, the predictability and reliability of the prime time and the fill percentage of the bubble trap remained consistent with each of the tests for wall roughness and the type of flow of the fluid.

Figure 18:
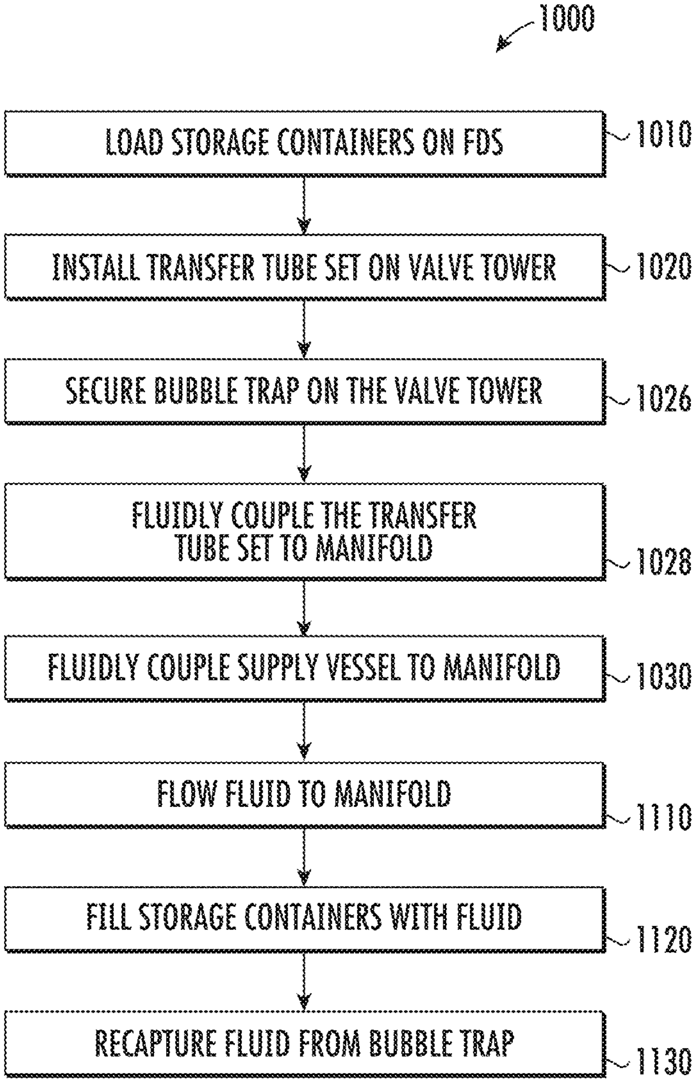
FIG. 18 is a flowchart of a method of priming a transfer tube set provided in accordance with the present disclosure.

With reference to FIG. 18, a method of priming a transfer tube set 1000 is provided in accordance with the present disclosure. The method 1000 is described with reference to the filling system 10, the tube holding apparatus 200, and the transfer tube set 440 shown in FIGS. 6-10, 13, and 14. The method 1000 is used to prime or remove air from the transfer tube set 440 and/or the storage containers 32 loaded on the fill and drain station 30. Removing air from the transfer tube set 440 and/or the storage containers 32 may improve filling of the storage containers 32, may improve freezing of fluid within the storage containers 32, and may improve the accuracy of an amount of fluid within the storage container 32.

To begin, the storage containers 32 are loaded onto the fill and drain station 30 (Step 1010). The storage containers 32 may all be the same size or may be of different sizes. The fill and drain station 30 may be a single sided including a single valve tower 20 or may be dual sided including two valve towers 20. When the storage containers 32 are loaded onto the fill and drain station 30, the storage containers 32 may be positioned on the scale 31 that is configured to weigh an amount of fluid within the storage containers 32.

The transfer tube set 440 is installed onto the valve tower 20 (Step 1020). The transfer tube set 440 is installed by securing the transfer tube set 440 to the valve tower 20 such that each connector 445 of the transfer tube set 440 is positioned adjacent a valve 22 which corresponds to a respective one of the storage containers 32. Specifically, each connector 445 is positioned above the respective storage container 32 such that the connection tube 446 that extends from the connector 445 has a tube geometry with a negative slope along the entire length to the storage connector 32 with the connection tube 446 passing through a respective valve 22. In some embodiments, a tube holder, e.g., tube holder 100, 200, may be used to set and maintain the tube geometry of the connection tube 446 and/or a container tube 36 extending from the container. The tube geometry of the connection tube 446 and/or the container tube 36 may be maintained such that there is a negative slope from the connector 445 to the respective container 32. The negative slope may allow air or gases to travel up the container tube 36 and the connection tube 446 such that the air or gasses pass through the connector 445 and into the riser 444 of the transfer tube set 440 as detailed below. An inclination angle of each of the connectors 445 may be set to a desired angle such that the connection portion 445*b* is angled downward from horizontal (Step 1024). The inclination angle may be in a range of 10 degrees to 60 degrees. The inclination angle of each connector 445 may aid in priming of the transfer tube set 440.

Installing the transfer tube set 440 may include securing a bubble trap 460 of the transfer tube set 440 to the valve tower 20 (Step 1026). Securing the bubble trap 460 may include positioning the bubble trap 460 such that the trap segment 464 forms the lowest portion of the bubble trap 460 that flows upward into the chamber 467 of the bulb 466. In embodiments including the entry segment, the entry segment is positioned over the trap segment 464. In addition, the vent segment 468 is positioned to extend from a top of the bulb 466 such that the vent segment 468 terminates above the trap segment 464.

Installing the transfer tube set 440 also includes fluidly coupling the transfer tube set 440 to an outlet of a manifold 50 of the valve tower 20 (Step 1028). The manifold 50 having one or more outlets that allow for use of the manifold 50 with multiple transfer tube sets before being replaced. The manifold 50 of one valve tower 20 may be fluidly coupled to a manifold 50 of another valve tower 50 such that both valve towers may receive fluid from a single supply vessel 14. It is noted that the manifold 50, the transfer tube set 440, and/or the containers 32 may have flow control devices that are manually or automated to prevent or allow fluid to flow through respective paths during priming and/or filling operations. The flow control devices may allow for sequential or simultaneous priming and/or filling of the transfer tube sets 440 and the storage containers 32.

A supply vessel 14 is positioned in or in communication with a control tower 12 which is fluidly coupled to the manifold 50 of the valve tower 20 (Step 1030). The supply vessel may include a biopharmaceutical composition to be distributed to each of the storage containers. The control tower may include one or more filters to filter or clean the biopharmaceutical composition before the biopharmaceutical composition enters the manifold 50.

With the storage containers 32 loaded onto the FDS 30, the transfer tube sets 440 installed on the valve tower 20, and the supply vessel fluidly coupled to the manifolds 50 the filling system 10 is prepared for priming. To start priming, the control tower is operated to provide a flow of fluid to the manifold 50 (Step 1110). Before, during, or after flow of fluid begins, flow control devices of the manifold 50 and the transfer tube set 440 are controlled such that there is an open fluid path that extends from the supply vessel, the manifold 50, through the riser 444 of the transfer tube set 440, to the outlet 449 of the transfer tube set 440. In some embodiments, fluid control devices in the connection tubes 446 are closed to prevent fluid from flowing into the storage containers. Such fluid control devices may close the connection tube 446 or a container tube 36 coupled to the connection tube 446. In other embodiments, fluid control devices are controlled such that each of the storage containers 32 have an open fluid path that extends to the outlet 449.

The fluid flow rate may be constant through the priming process. In some embodiments, the fluid flow rate may vary during the priming procedure. For example, at the start of a priming process, the fluid flow rate may have a first or high flow rate that allows fluid to fill the manifold 50 and the riser 444 of the transfer tube set 440. This first flow rate may last for a few seconds to a minute depending on the viscosity of the fluid, the volume of the transfer tube set, and other factors. Once the transfer tube set 440 is filled to the last or top connector 445, the fluid may be provided at a second or low flow rate while the fluid fills the connection tubes 446 and/or the containers 32. As the fluid flows into the transfer tube set 440, air and/or gas within the connection tubes 446 and/or the containers 32 flow towards the riser 444 of the transfer tube set 440 and are encouraged to flow through the bubble trap 460 such that the air and gas exit the transfer tube set 440. The transfer tube set 440 is considered fully primed when all or substantially all of the air is removed upstream of the last or uppermost connector 445 or at the start of the entry segment 462 of the bubble trap 460. The second flow rate may allow fluid to displace air and gas from the connection tubes 446 and the storage containers 32 while the air and gas flow downstream towards the outlet 449.

While the air and gas flow out the bubble trap 460, some fluid may enter the bulb 446 of the bubble trap 460. The fluid that enters the bulb 446 may represent a fill percentage of the bubble trap 460. In embodiments where the bubble trap 460 includes an entry segment 462 positioned above the trap segment 464, the fluid in the bulb 446 remains until the priming is complete. If the bulb 446 entirely fills with fluid before priming is complete, the priming process may be considered to have failed.

In some embodiments where the transfer tube set 440 is primed with the storage containers 32 isolated by a flow controller, the method 1000 filling the storage containers 32 with fluid after priming of the transfer tube set 440 (Step 1120). Filling the storage containers 32 may include opening a flow controller of one or more of the storage containers 32 while a flow of fluid is provided. The flow rate of fluid during filling may be the same as the first flow rate or the second flow rate or may be different from the first or second flow rate. In some embodiments the flow rate during filling may be greater than the second flow rate but less than the first flow rate. The flow controller of the storage container 32 may be closed when the storage container 32 is filled with a desired amount of fluid. The desired amount of fluid may be determined by the scale of the FDS 30. When the container 32 is filled, the flow controller of the container 32 may be controlled to close or isolate the container 32 and a flow controller of another container 32 may be opened to fill another container 32. The containers 32 may be filled from bottom to top or from top to bottom.

In some embodiments, fluid from the transfer tube set 440 and/or the bubble trap 460 may be recaptured (Step 1130). For example, the fluid from the transfer tube set 440 or the bubble trap 460 is filtered and maintained aseptic such that the fluid remains viable for a future use. By maintaining the fluid in the bubble trap 460 viable for future use, the fluid within the bubble trap 460 is not considered waste but is recovered. As the biopharmaceutical composition of the fluid recaptured in the bubble trap 460 can be expensive, reducing waste fluid scan result in significant cost savings.

Although the method steps are described in a specific order, it should be understood that other steps may be performed in between described steps, described steps may be adjusted so that they occur at slightly different times, or the described steps may occur in any order unless otherwise specified.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A filling system for filling storage containers with a fluid, the filling system comprising:

a first storage container;

a second storage container stacked above the first storage container;

a valve tower positioned horizontally spaced apart from the first storage container and the second storage container, the valve tower having a manifold, the manifold configured to receive a fluid; and a transfer tube set comprising:

an inlet at an upstream end of the transfer tube set, the inlet fluidly coupled to the manifold;

an outlet at a downstream end of the transfer tube set, the outlet open to an environment surrounding the filling system;

a first connection tube fluidly coupled to the first storage container to aseptically provide fluid from the manifold to the first storage container, the first connection tube extending laterally from the first storage container towards the valve tower;

a second connection tube fluidly coupled to the second storage container to aseptically provide fluid from the manifold to the second storage container, the second connection tube extending laterally from the second storage container towards the valve tower; and a riser extending between and fluidly coupling the inlet to the outlet, the riser secured to the valve tower to extend substantially vertically from the inlet to the outlet, the riser including a first connector that fluidly couples the first connection tube to the riser, the riser including a second connector that fluidly couples the second connection tube to the riser, the second connector positioned above the first connector, the first connector comprises:

a first interlink portion;

a second interlink portion; and a connection portion extending from the first interlink portion and the second interlink portion to form a Y-shape with the first interlink portion and the second interlink portion defining a Y-angle therebetween less than 130 degrees, the connection portion of the first connector fluidly coupled to the first connection tube and configured to fill the first storage container with the fluid received by the manifold.

2. The filling system according to claim 1, wherein the Y-angle between the first interlink portion and the second interlink portion is in a range of 30 degrees to 90 degrees.

3. The filling system according to claim 1, further comprising a tube holding apparatus configured to maintain a negative slope in the first connection tube from the first connector to the first storage container.

4. The filling system according to claim 1, further comprising a fill and drain station that supports the first storage container and the second storage container, the fill and drain station including a scale configured to determine a volume of fluid in the first storage container and the second storage container based on a mass of the fill and drain station.

5. The filling system according to claim 1, wherein the connection portion of the first connector is angled downward at an inclination angle from horizontal.

6. The filling system according to claim 5, wherein the inclination angle is in a range of 15 degrees to 35 degrees.

7. The filling system according to claim 1, wherein the first interlink portion defines a first interlink central longitudinal axis and the connector portion defines a connector central longitudinal axis, the first interlink central longitudinal axis and the connector central longitudinal axis offset from one another by a connector angle, the connector angle being greater than or equal to 115 degrees.

8. The filling system according to claim 7, wherein the connector angle is in a range of 135 degrees to 165 degrees.

9. The filling system according to claim 1, wherein the riser includes a first interlink tube that extends between and fluidly couples the first connector and the second connector, the first interlink tube having a length in a range of 130 percent and 180 percent of the vertical distance between the first connector and the second connector.

10. The filling system according to claim 1, the transfer tube set includes a bubble trap downstream of the second connector and upstream of the outlet, the bubble trap configured to aseptically receive and store fluid from priming such that the captured fluid may be recaptured without further processing.

11. The filling system according to claim 10, wherein the bubble trap includes a trap segment, a bulb, and a vent segment, the trap segment positioned between the second connector and the bulb, the trap segment in direct communication with and positioned below the bulb, the vent segment extending vertically from the bulb and extending to the outlet.

12. The filling system according to claim 11, wherein the bulb is sized such that the bulb is configured to only be partially filled during a priming process.

13. A filling system for filling storage containers with a fluid, the filling system comprising:

a first storage container;

a second storage container stacked above the first storage container;

a valve tower positioned horizontally spaced apart from the first storage container and the second storage container, the valve tower having a manifold, the manifold configured to receive a fluid; and a transfer tube set comprising:

an inlet at an upstream end of the transfer tube set, the inlet fluidly coupled to the manifold;

an outlet at a downstream end of the transfer tube set, the outlet open to an environment surrounding the filling system;

a first connection tube fluidly coupled to the first storage container to aseptically provide fluid from the manifold to the first storage container, the first connection tube extending horizontally from the first storage container towards the valve tower;

a second connection tube fluidly coupled to the second storage container to aseptically provide fluid from the manifold to the second storage container, the second connection tube extending horizontally from the second storage container towards the valve tower; and a riser extending between and fluidly coupling the inlet to the outlet, the riser secured to the valve tower to extend substantially vertically from the inlet to the outlet, the riser including a first interlink tube, a second interlink tube, a first connector, and a second connector that are in fluid communication with one another, the first interlink tube extending from the inlet to the first connector, the second interlink tube extending between the first connector and the second connector, the second connector positioned above the first connector, the first connector comprises:

a first interlink portion fluidly coupled to the first interlink tube;

a second interlink portion fluidly coupled to the second interlink tube; and a connection portion extending from the first interlink portion and the second interlink portion, the connection portion of the first connector fluidly coupled to the first connection tube and configured to fill the first storage container with the fluid received by the manifold, the connection portion extending in a substantially horizontal direction and angled downward at an inclination angle from horizontal.

14. The filling system according to claim 13, wherein the inclination angle is in a range of 15 degrees to 35 degrees.

15. The filling system according to claim 13, wherein the inclination angle is in a range of 15 degrees to 30 degrees.

16. The filling system according to claim 13, wherein the connection portion extends from the first interlink portion and the second interlink portion to form a Y-shape with the first interlink portion and the second interlink portion.

17. The filling system according to claim 16, wherein the first interlink portion and the second interlink portion defining an angle therebetween less than 130 degrees.

18. The filling system according to claim 17, wherein the angle between the first interlink portion and the second interlink portion is in a range of 30 degrees to 90 degrees.

19. The filling system according to claim 16, wherein the first interlink portion defines a first interlink central longitudinal axis and the connector portion defines a connector central longitudinal axis, the first interlink central longitudinal axis and the connector central longitudinal axis offset from one another by a connector angle, the connector angle being greater than or equal to 115 degrees.

20. The filling system according to claim 13, the transfer tube set includes a bubble trap downstream of the second connector and upstream of the outlet, the bubble trap configured to aseptically receive and store fluid from priming such that the captured fluid may be recaptured without further processing.

21. The filling system according to claim 20, wherein the bubble trap includes a trap segment, a bulb, and a vent segment, the trap segment positioned between the second connector and the bulb, the trap segment in direct communication with and positioned below the bulb, the vent segment extending vertically from the bulb and extending to the outlet.

22. The filling system according to claim 21, wherein the bulb is sized such that the bulb is configured to only be partially filled during a priming process.

23. A transfer tube set comprising:

an inlet at an upstream end of the transfer tube set, the inlet configured to fluidly couple to a manifold to receive fluid;

an outlet at a downstream end of the transfer tube set, the outlet open to an environment surrounding the transfer tube set;

a first connection tube configured to fluidly couple to a first storage container to aseptically provide fluid from the manifold to the first storage container;

a second connection tube configured to fluidly couple to a second storage container to aseptically provide fluid from the manifold to the second storage container; and a riser extending between and fluidly coupling the inlet to the outlet, the riser including a first connector that fluidly couples the first connection tube to the riser, the riser including a second connector that fluidly couples the second connection tube to the riser, the riser configured to extend substantially vertically from the inlet to the outlet, the first connection tube configured to extend laterally from the riser to the first storage container, the second connection tube configured to extend laterally from the riser to the second storage container; the first connector comprising:

a first interlink portion defining a first interlink central longitudinal axis;

a second interlink portion defining a second interlink central longitudinal axis, the second interlink central longitudinal axis offset at a Y-angle from the first interlink central longitudinal axis, the Y-angle being less than 135 degrees; and a connection portion extending from the first interlink portion and the second interlink portion to form a Y-shape with the first interlink portion and the second interlink portion, the connection portion of the first connector fluidly coupled to the first connection tube.

24. The transfer tube set according to claim 23, wherein the Y-angle is in a range of 30 degrees to 90 degrees.

25. The transfer tube set according to claim 23, wherein the connection portion defines a connection central longitudinal axis, the connection central longitudinal axis offset from the first interlink central longitudinal axis by a connection angle, the connection angle being greater than or equal to 115 degrees.

26. The transfer tube set according to claim 23, further comprising a bubble trap downstream of the second connector and upstream of the outlet, the bubble trap configured to aseptically receive and store fluid from priming such that the captured fluid may be recaptured without further processing.

27. The transfer tube set according to claim 26, wherein the bubble trap includes a trap segment, a bulb, and a vent segment, the trap segment positioned between the second connector and the bulb, the trap segment in direct communication with and positioned below the bulb, the vent segment extending vertically from the bulb and extending to the outlet.

28. The transfer tube set according to claim 27, wherein the bulb is sized such that the bulb is configured to only be partially filled during a priming process.

29. The filling system according to claim 23, wherein the riser includes a first interlink tube that fluidly couples to the second interlink portion of the first connector and to the first interlink portion of the second connector to fluidly couple the first connector and the second connector, the first interlink tube configured to have a C-shape when the first connector and the second connector are installed on a valve tower.

30. The filling system according to claim 23, wherein the riser includes a first interlink tube that fluidly couples to the second interlink portion of the first connector and to the first interlink portion of the second connector to fluidly couple the first connector and the second connector, the first connector and the second connector configured to be installed on a valve tower such that a vertical distance is defined therebetween, the first interlink tube having a length in a range of 130 percent and 180 percent of the vertical distance between the first connector and the second connector when the first connector and the second connector are installed on the valve tower.

* * * * *